United States Patent [19]
Kondo et al.

[11] Patent Number: 5,815,209
[45] Date of Patent: Sep. 29, 1998

[54] ENCODING METHOD, AN ENCODING APPARATUS, A DECODING METHOD AND A DECODING APPARATUS FOR A MOVING PICTURE

[75] Inventors: Satoshi Kondo, Sakai; Yoshinari Takemura, Settsu; Ryoji Yamaguchi, Katano; Hiroyuki Suzuki, Matsubara, all of Japan

[73] Assignee: Matsushita Electric Industrial Co., Ltd., Osaka, Japan

[21] Appl. No.: 854,758

[22] Filed: May 12, 1997

Related U.S. Application Data

[63] Continuation of Ser. No. 336,511, Nov. 9, 1994, abandoned.

[30] Foreign Application Priority Data

| Nov. 9, 1993 | [JP] | Japan | 5-279514 |
| Apr. 21, 1994 | [JP] | Japan | 6-083087 |

[51] Int. Cl.$^6$ ........................................ H04N 7/30
[52] U.S. Cl. ........................................ 348/403; 348/420
[58] Field of Search ........................ 348/401, 402, 348/408, 409, 413, 416, 422, 403, 400

[56] References Cited

U.S. PATENT DOCUMENTS

| 4,734,767 | 3/1988 | Kaneko et al. . |
| 4,796,087 | 1/1989 | Guichard et al. . |
| 4,862,264 | 8/1989 | Wells et al. . |
| 4,903,124 | 2/1990 | Hoshi et al. . |
| 5,086,480 | 2/1992 | Sexton . |
| 5,191,525 | 3/1993 | LeBrun et al. . |
| 5,204,740 | 4/1993 | Ishii . |
| 5,311,210 | 5/1994 | Jozawa et al. ............ 348/416 |
| 5,311,307 | 5/1994 | Yoshimoto . |

FOREIGN PATENT DOCUMENTS

| 0244002 | 11/1987 | European Pat. Off. . |
| 0497058 | 8/1992 | European Pat. Off. . |
| 0502622 | 9/1992 | European Pat. Off. . |
| 0594338 | 4/1994 | European Pat. Off. . |
| 62-86464 | 4/1987 | Japan . |
| 3-32185 | 2/1991 | Japan . |
| 3-83470 | 4/1991 | Japan . |
| 3-296379 | 12/1991 | Japan . |
| 4-72976 | 3/1992 | Japan . |
| 4-139986 | 5/1992 | Japan . |
| 4-195688 | 7/1992 | Japan . |
| 4-326255 | 11/1992 | Japan . |
| 5-183891 | 7/1993 | Japan . |
| 5-252506 | 9/1993 | Japan . |
| 2270811 | 3/1994 | United Kingdom . |
| WO9016130 | 12/1990 | WIPO . |
| 92/05554 | 4/1992 | WIPO . |

*Primary Examiner*—Amelia Au
*Attorney, Agent, or Firm*—Ratner & Prestia

[57] ABSTRACT

A method for encoding a picture based on an intra-picture coding and an inter-picture prediction coding having an absolute value of a maximum range of motion compensation between continuous pictures in terms of time being H pixels (H: a positive integer) in a first direction and V pixels (V: a positive integer) in a second direction, the method includes the steps of: receiving a picture and judging whether the picture is directly/indirectly referred to by a further picture among the continuous pictures in terms of time or not; determining a maximum distance L (L: a positive integer) between the picture and the further picture directly/indirectly referring to the picture; dividing the picture into a first to an Nth sub-pictures (N: an integer equal to or larger than 2), a size of the first to the Nth sub-pictures being larger by at least L×V pixels in the first direction or at least L×H pixels in the second direction as compared with a region of a case where the picture is equally divided into N regions which do not overlap each other; generating a first to an Nth code sequences corresponding to the respective first to the Nth sub-pictures by encoding the first to the Nth sub-pictures based on the intra-picture coding and the inter-picture prediction coding; and adding information indicating positions of the first to the Nth code sequences in the picture.

14 Claims, 13 Drawing Sheets

ENCODING METHOD, AN ENCODING APPARATUS, A DECODING METHOD AND A DECODING APPARATUS FOR A MOVING PICTURE

This application is a continuation of application Ser. No. 08/336,511 filed Nov. 9, 1994, now abandoned.

BACKGROUND OF THE INVENTION

1. Field of the Invention

The present invention relates an encoding method, an encoding apparatus, a decoding method, and a decoding apparatus for moving pictures for dividing a picture into a plurality of regions and then encoding and decoding each of the said regions.

2. Description of the Related Art

In recent years, an encoding method employing both an intra-picture coding and an inter-picture prediction coding is widely used as a high-efficiency encoding method for moving picture signals. In the case where this method is adopted to the moving pictures including a number of pixels such as HDTV signals, it is difficult to process an entire picture in real time by a single encoder. Therefore, a method for dividing the picture into a plurality of regions and encoding each of the regions has been proposed.

In such an encoding method, in the case where the image data of the divided regions are individually stored into a picture memory by the respective encoders and encoding the picture by using the picture data in each region alone, picture data for reference of motion compensation cannot be obtained from the adjacent regions when the inter-frame prediction coding is performed. As a result, discontinuity occurs in the vicinity of the boundary of the regions, thereby causing visual deterioration.

In order to solve the above problem, a method for performing the motion compensation over the divided regions has been proposed. Japanese Laid-Open Patent Publication No. 4-139986 discloses a method for connecting a group of picture memories, in which the picture data of each divided region is stored, to a group of encoders through a selector. By this method, it is possible for each encoder to obtain the picture data from the picture memory of the adjacent regions by switching the selector.

In the above configuration, however, the encoders should access the picture memory through the selector. This becomes a problem in the case where the encoders are required to access with high speed, and this increases the circuit in size. Moreover, in the case where the code sequences generated by the above encoders are decoded, decoders should obtain the picture data by accessing the memory in which the picture data of the adjacent region is stored. Therefore, it is impossible for the decoders to access with high speed, and the size of the circuit is increased.

On the other hand, in the encoding method using the division of the picture, some methods unite code sequences generated by the respective encoders into one have been proposed. Japanese Laid-Open Patent Publication No. 62-86464 proposes a method for combining the code sequences of respective regions together in a simple way. Japanese Laid-Open patent Publication No. 4-326255 discloses a method for inserting a marker code into the head of the code sequence of each region, thereby combining the code sequences together.

With the above configuration, however, the problem arises in that the code sequence cannot be decoded in the case where the dividing method and the number of divided regions of the encoding and decoding methods are different from each other. Even if the code sequence of each divided picture satisfies the syntax of standard, the whole code sequence obtained by uniting the code sequences of respective divided pictures into one does not satisfy the syntax of standard. Thus, the problem arises in terms of compatibility.

SUMMARY OF THE INVENTION

A method according to the present invention for encoding a picture based on an intra-picture coding and an inter-picture prediction coding having an absolute value of a maximum range of motion compensation between continuous pictures in terms of time being H pixels (H: a positive integer) in a first direction and V pixels (V: a positive integer) in a second direction, the method includes the steps of:

receiving a picture and judging whether the picture is directly/indirectly referred to by a further picture among the continuous pictures in terms of time or not;

determining a maximum distance L (L: a positive integer) between the picture and the further picture directly/indirectly referring to the picture;

dividing the picture into a first to an Nth sub-pictures (N: an integer equal to or larger than 2), a size of the first to the Nth sub-pictures being larger by at least L×V pixels in the first direction or at least L×H pixels in the second direction as compared with a region of a case where the picture is equally divided into N regions which do not overlap each other;

generating a first to an Nth code sequences corresponding to the respective first to the Nth sub-pictures by encoding the first to the Nth sub-pictures based on the intra-picture coding and the inter-picture prediction coding; and adding information indicating positions of the first to the Nth code sequences in the picture.

An apparatus for encoding a picture according to the present invention, includes:

a picture division means for receiving the picture and dividing the picture into a first to an Nth sub-pictures (N: an integer equal to or larger than 2);

a picture division control means for controlling a size of the first to the Nth sub-pictures;

an encoding means for encoding the first to the Nth sub-pictures and generating a first to an Nth code sequences corresponding to the first to the Nth sub-pictures, based on an intra-picture coding and an inter-picture prediction coding having an absolute value of a maximum range of motion compensation between continuous pictures in terms of time being H pixels (H: a positive integer) in a first direction and V pixels (V: a positive integer) in a second direction; and an addition means for adding information indicating positions of the first to the Nth code sequences in the picture, wherein the picture division control means judges whether the picture is directly/indirectly referred to by a further picture among the continuous pictures in terms of time or not and determines a maximum distance L (L: positive integer) between the picture and a further picture directly/indirectly referring to the picture in the case where the picture is judged to be directly/indirectly referred to by the other picture, and wherein the picture division means divides the picture so that a size of each of the first to the Nth sub-pictures is larger by at least L×V pixels in the first direction or by at least L×H pixels in the second direction as compared with a size of each of N sub-pictures which are obtained by equally dividing the picture without overlapping each other, in the case where the picture is judged to be directly/indirectly referred to by the other picture, and divides the picture so that the size of the first to the Nth sub-pictures is equal to a size of the regions in the case where the picture is judged not to directly/indirectly referred to by the further picture.

According to another aspect of the present invention, a method for decoding a plurality of code sequences, includes the steps of:

receiving a first to an Nth code sequences corresponding to N regions by dividing a picture into N regions (N: an integer equal to or larger than 2) which overlap each other and including information indicating positions in the picture, and identifying the information indicating the positions in the picture;

generating a first to an Nth sub-pictures corresponding to the first to the Nth code sequences by decoding the first to the Nth code sequences in accordance with the information indicating the positions in the picture;

specifying the portion in which the first to the Nth sub-pictures overlap each other during decoding of the first to the Nth code sequences;

eliminating the overlapping portion specified by the first to the Nth sub-pictures; and obtaining one picture by synthesizing the first to the Nth sub-pictures in which the overlapping portion is eliminated.

According to another aspect of the present invention, an apparatus for decoding a plurality of code sequences, includes:

an identification means for receiving a first to an Nth code sequences corresponding to N regions by dividing a picture into N regions (N: an integer equal to or larger than 2) which overlap each other and including information indicating positions in the picture, and for identifying the information indicating the positions in the picture;

a decoding means for generating a first to an Nth sub-pictures corresponding to the first to the Nth code sequences by decoding the first to the Nth code sequences in accordance with the information indicating the positions in the picture;

a picture synthesis control means for specifying the portion in which the first to the Nth sub-pictures overlap each other during decoding of the first to the Nth code sequences and for generating a control signal indicating the specified overlapping portion; and a picture synthesis means for eliminating the overlapping portion specified by the first to the Nth sub-pictures and for obtaining one picture by synthesizing the first to the Nth sub-pictures in which the overlapping portion is eliminated.

According to still another aspect of the present invention, a method for encoding a picture, includes the steps of:

receiving a picture and dividing the picture into a first to an Nth sub-pictures (N: an integer equal to or larger than 2);

generating a header related to a hierarchical level of picture or higher levels;

encoding the first to the Nth sub-pictures and generating a first to an Nth code sequences corresponding to the respective first to the Nth sub-pictures;

adding the header to one of the first to the Nth code sequences; and generating a code sequence corresponding to the picture by combining the first to the Nth code sequences together at a portion corresponding to a boundary between the first to the Nth sub-pictures and a boundary between continuous pictures in terms of time, wherein an order of the combined code sequences is equal to an order of code sequences obtained by encoding the picture without dividing the picture.

According to still another aspect of the present invention, an apparatus for encoding a picture, includes:

a picture division means for receiving a picture and dividing the picture into a first to an Nth sub-pictures (N: an integer equal to or larger than 2);

a control means for generating a control signal regarding a header related to a hierarchical level of picture or higher levels;

an encoding means for encoding the first to the Nth sub-pictures, generating a first to an Nth code sequences corresponding to the first to the Nth sub-pictures and adding the header to one of the first to the Nth code sequences in accordance with the control signal; and a code sequence combining means for generating a code sequence corresponding to the picture by combining the first to the Nth code sequences together at a portion corresponding to a boundary between the first to the Nth sub-pictures and a boundary between continuous pictures in terms of time, wherein an order of the combined code sequences is equal to an order of code sequences obtained by encoding the picture without dividing the picture.

According to still another aspect of the present invention, a method for decoding a code sequence, includes the steps of:

receiving a code sequence including a header and detecting the header;

dividing the code sequence into a first to an Nth code sequences (N: an integer equal to or larger than 2), based on the detected header and a predetermined dividing method of a picture;

generating a first to an Nth sub-pictures corresponding to the first to the Nth code sequences by decoding the first to the Nth code sequences; and obtaining one picture by synthesizing the first to the Nth sub-pictures.

In one embodiment of the present invention, a code sequence succeeding the header is treated as a code sequence corresponding to an upper left portion of the picture in the case where the detected header is related to a hierarchical level of picture or higher levels.

In another embodiment of the present invention, the method further includes the step of adding the header to a code sequence except the code sequence succeeding the header, which corresponds to a sub-picture different from a sub-picture to which the code sequence succeeding the header corresponds in the case where the detected header relates to a hierarchical level of picture or higher levels.

In still another embodiment of the present invention, the method further includes the step of obtaining a range of motion compensation from the detected header, wherein the dividing step includes the step of determining a size of the first to the Nth code sequences so that at least part of the first to the Nth code sequences overlap each other, based on the range of the motion compensation, and wherein the synthesizing step includes the steps of:

specifying a portion in which the first to the Nth sub-pictures overlap each other;

eliminating the specified overlapping region from the first to the Nth sub-pictures; and obtaining a picture by synthesizing the first to the Nth sub-pictures in which the overlapping portion is eliminated.

According to still another aspect of the present invention, an apparatus for decoding a picture, includes:

a detection means for receiving a code sequence including a header and detecting the header;

a division control means for generating a control signal defining a timing for dividing the code sequence based on the detected header and a predetermined dividing method of a picture;

a code sequence division means for dividing the picture into a first to an Nth sub-pictures (N: an integer equal to or larger than 2) in accordance with the control signal;

a decoding means for generating a first to an Nth sub-pictures corresponding to the first to the Nth code sequences by decoding the first to the Nth code sequences; and a picture synthesis means for obtaining one picture by synthesizing the first to the Nth sub-pictures.

In one embodiment of the present invention, a code sequence succeeding the header is treated as a code sequence corresponding to an upper left portion of the picture, in the case where the detected header is related to a hierarchical level of picture or higher levels.

In another embodiment of the present invention, the division control means outputs, to the code sequence division means, a further control signal for adding the header to a code sequence except the code sequence succeeding the header which corresponds to a sub-picture different from a sub-picture to which the code sequence succeeding the header corresponds, in the case where the detected header relates to a hierarchical level of picture or higher levels, and wherein the code sequence output means distributes the header to the decoding means in accordance with the further control signal.

In still another embodiment of the present invention, the apparatus further includes a header information analysis means for obtaining information indicating a range of motion compensation from the detected header, wherein the control signal generated by the division control means determines a size of the first to the Nth code sequences so that at least part of the first to the Nth code sequences overlaps each other, based on the information indicating the range of the motion compensation, and wherein the picture synthesis means obtains a picture by specifying a portion in which the first to the Nth sub-pictures overlap each other, eliminating the specified overlapping portion from the first to the Nth sub-pictures and synthesizing the first to the Nth sub-picture in which the overlapping portion is eliminated.

According to still another aspect of the present invention, an apparatus for decoding a code sequence, includes:

a first decoding means for detecting a header by decoding a code sequence including the header;

a division control means for generating a first control signal defining a timing for dividing the code sequence and a second control signal defining a timing for completing a division of a code sequence corresponding to one picture, based on the detected header and a predetermined dividing method of a picture;

a code sequence dividing means for dividing the code sequence into the first to the Nth code sequences (N: an integer equal to or larger than 2) in accordance with the first control signal;

a storing means for storing the first code sequence;

a second decoding means for generating a second to an Nth sub-pictures corresponding to the second to the Nth code sequences by decoding the second to the Nth code sequences;

a selecting means for selectively outputting one of an inputted code sequence and the first code sequence stored in the storing means to the first decoding means in accordance with the second control signal, the first decoding means generating a first sub-picture corresponding to the first code sequence by decoding the first code sequence in the case where the first code sequence stored in the storing means is outputted to the first decoding means by the selecting means; and a picture synthesis means for obtaining a picture by synthesizing the first to the Nth sub-pictures.

In one embodiment of the present invention, a code sequence succeeding the header is treated as a code sequence corresponding to an upper left portion of the picture in the case where the detected header is related to a hierarchical level of picture or higher levels.

In another embodiment of the present invention, the division control means outputs, to the code sequence dividing means, a third control signal for adding the header to a code sequence except the code sequence succeeding the header and corresponding to a sub-picture different from a sub-picture to which the code sequence succeeding the header corresponds, in the case where the detected header relates to a hierarchical level of picture or higher levels, and wherein the code sequence output means distributes the header to the decoding means in accordance with the third control signal.

In still another embodiment of the present invention, the apparatus further includes a header information analysis means for obtaining information indicating a range of a motion compensation from the detected header, wherein the first control signal generated by the division control means determines a size of the first to the Nth code sequences so that at least part of the first to the Nth code sequences overlaps each other, based on the information indicating the range of the motion compensation, and wherein the picture synthesis means obtains a picture by specifying a portion in which the first to the Nth sub-pictures overlap each other, eliminating the specified overlapping portion from the first to the Nth sub-pictures and synthesizing the first to the Nth sub-picture in which the overlapping portion is eliminated.

Thus, the invention described herein makes possible the following advantages.

(1) The invention provides an encoding method and an encoding apparatus for moving pictures in which an encoder is capable of encoding without accessing a memory of another encoder processing an adjacent region in the case where a picture is divided into a plurality of regions and each divided region is encoded, and an increased amount of codes becomes a minimum as compared with conventional encoding methods and conventional apparatus.

(2) The invention provides a decoding method and a decoding apparatus for moving pictures in which a decoder is capable of decoding without accessing the memory of another decoder processing an adjacent region in the case where a code sequence generated by the above encoding method and encoding apparatus is decoded.

(3) The invention provides an encoding method and an encoding apparatus for generating a code sequence having the same syntax as that of the picture which is encoded without being divided, where a picture is divided into a plurality of regions and each divided region is encoded. The invention also provides a decoding method and a decoding apparatus for moving pictures in which a code sequence having the same syntax of a code sequence encoded and generated without dividing the picture is inputted and the inputted code sequence is divided and then decoded by a plurality of decoders, thereby reproducing moving pictures of the entire picture.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the figures.

Figure 1:
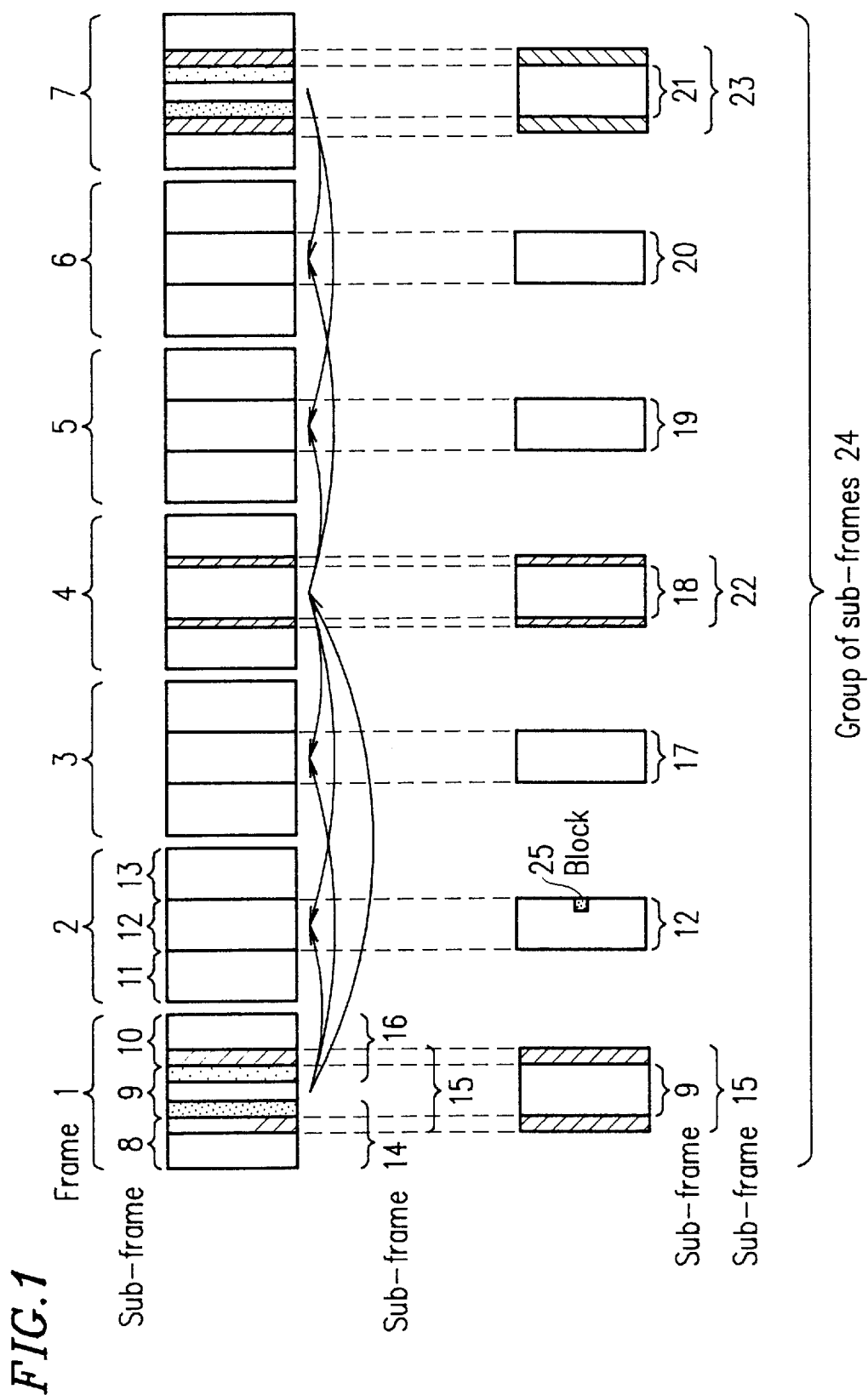
FIG. 1 is a schematic diagram showing the pattern of an example of a first method for encoding moving pictures according to the present invention.

An example of a first encoding method for moving pictures according to the present invention will be described with reference to FIG. 1. FIG. 1 shows a schematic diagram showing the reference relationship in an inter-frame prediction coding and a method for dividing the picture, regarding frames 1, 2, 3, 4, 5, 6 and 7 in the moving picture. The arrows below the respective frames indicate the reference relationship in the inter-frame prediction coding. The frames which are positioned at the start of the arrows represent the frames to be referred to, and the frames which are positioned at the ends of the arrows represent the frames which refer to the frames at the start of each of the arrows. Thus, the frames 1 and 7 are performed the intra-frame coding. The frame 4 is performed the inter-frame prediction coding by referring to the preceding frame 1. Furthermore, the frames 2 and 3 are performed the inter-frame prediction coding by bidirectionally referring to the frames 1 and 4, and the frames 5 and 6 are performed the inter-frame prediction coding by bidirectionally referring to the frames 4 and 7.

First, the case where the input frame is vertically divided into three regions so that the divided regions do not overlap each other will be considered. With this operation, for example, the frame 1 is divided into sub-frames 8, 9, and 10, and the frame 2 is divided into sub-frames 11, 12 and 13. The sequences of sub-frames which are in the same positions of the respective frames are encoded as the same sequence by using the intra-frame/inter-frame prediction coding. For example, since the sub-frames 8 and 11 are positioned on the left of the frames, respectively, they are included in the same sequence. A sub-frame group 24 includes the sub-frames which are positioned in the center of the frames and are arranged from left to right in the time order. The sub-frame group 24 consists of sub-frames 9, 12, 17, 18, 19, 20 and 21.

Next, the case where a block 25, which is positioned on the right of the sub-frame 12, is encoded by the inter-frame prediction coding will be considered. In the case where a reference block is obtained from the sub-frame 9, it is necessary to obtain the frame data from the external region of the sub-frame 9, i.e., the sub-frame 10. In order to individually encode the sequence of central sub-frames and the sequence of right sub-frames in the frame, the frame data in the sub-frame 10 should be processed as far as the block 25 refers to when the sub-frame 9 is encoded. Assuming that the range of motion compensation between the continuous frames in terms of time is ±16 pixels in the vertical direction and ±16 pixels in the horizontal direction. In the case where the sub-frame 9 is processed, it is sufficient to encode the sub-frame having the region obtained by enlarging the both sides of the sub-frame 9 by 16 pixels, respectively. In the same manner, in the case where the sub-frame 17 refers to the sub-frame 9, it is sufficient to encode the sub-frame having the region obtained by enlarging the both sides of the sub-frame 9 by 32 pixels, respectively, since there is a distance for two frames.

Consequently, the sub-frame 18 has the maximum distance from the sub-frame 9 among the sub-frames directly referring to the sub-frame 9, and the distance is three frames. Therefore, it is sufficient to encode the sub-frame having the region which is obtained by enlarging the both sides of the sub-frame 9 by 48 pixels, respectively. However, since the sub-frame 18 is referred to by the sub-frames 12, 17, 19 and 20, the sub-frame 9 is indirectly referred to by the sub-frames 12, 17, 19, and 20. Thus, in order to determine the size of the region of the sub-frame 9 to be encoded, the effect from the sub-frames which indirectly refer to the sub-frame 9 should be taken into consideration. In this case, the sub-frame 12 or 20 has the maximum distance from the sub-frame 9 among the sub-frames indirectly referring to the sub-frame 9. The distance between the sub-frame 9 and the sub-frame 12 or 20 through the sub-frame 18 is five frames. Thus, it is sufficient for the sub-frame 9 to encode the sub-frame 15 having the region which is obtained by enlarging the both sides of the sub-frame 9 by 80 pixels, respectively.

Concerning the other sub-frames of the frame 1, the sub-frames 14 and 16 are areas for encoding the frame data of the sub-frames 8 and 10, respectively. In this case, the size of the enlarged region is the same as in the case of the sub-frame 9.

Next, the sub-frame 18 will be considered. There are no sub-frames which indirectly refer to the sub-frame 18. The sub-frame 12 or 20 has the maximum distance from the sub-frame 18 among the sub-frames directly referring to the sub-frame 18. In this case, the distance is two frames. Thus, it is sufficient for the sub-frame 18 to encode the sub-frame 22 having the region obtained by enlarging the both sides of the sub-frame 18 by 32 pixels, respectively.

Regarding the sub-frames which belong to the frames 2, 3, 5 and 6 which are not referred to during the motion compensation in the inter-frame prediction coding, that is, the sub-frames 12, 17, 19 and 20, it is not necessary to enlarge the regions.

As is understood from the above, in order to divide the frame into a plurality of regions and individually encode each region, that is, encode the region by only using the frame data which is encoded in each region, it is sufficient to perform the following operation. Assuming that the absolute value of the maximum range of motion compensation between the continuous frames in terms of time is H pixels in the horizontal direction and V pixels in the vertical direction. First, if an input frame is referred to by the other frames during the motion compensation in the inter-frame prediction coding, the maximum distance between the input frame and the frame which directly or indirectly refers to the input frame is obtained. Assuming that the distance of the frames is L frames. The sub-frame having the region obtained by enlarging the upper and lower sides by L×V pixels or more and the right and left sides by L×H pixels or more of the region which is obtained by dividing the frame so that the divided regions do not overlap each other, respectively. If the input frame is not referred to during the motion compensation in the inter-frame coding, the sub-frame having the region which is obtained by dividing the frame so that the divided regions do not overlap each other.

Figure 2:
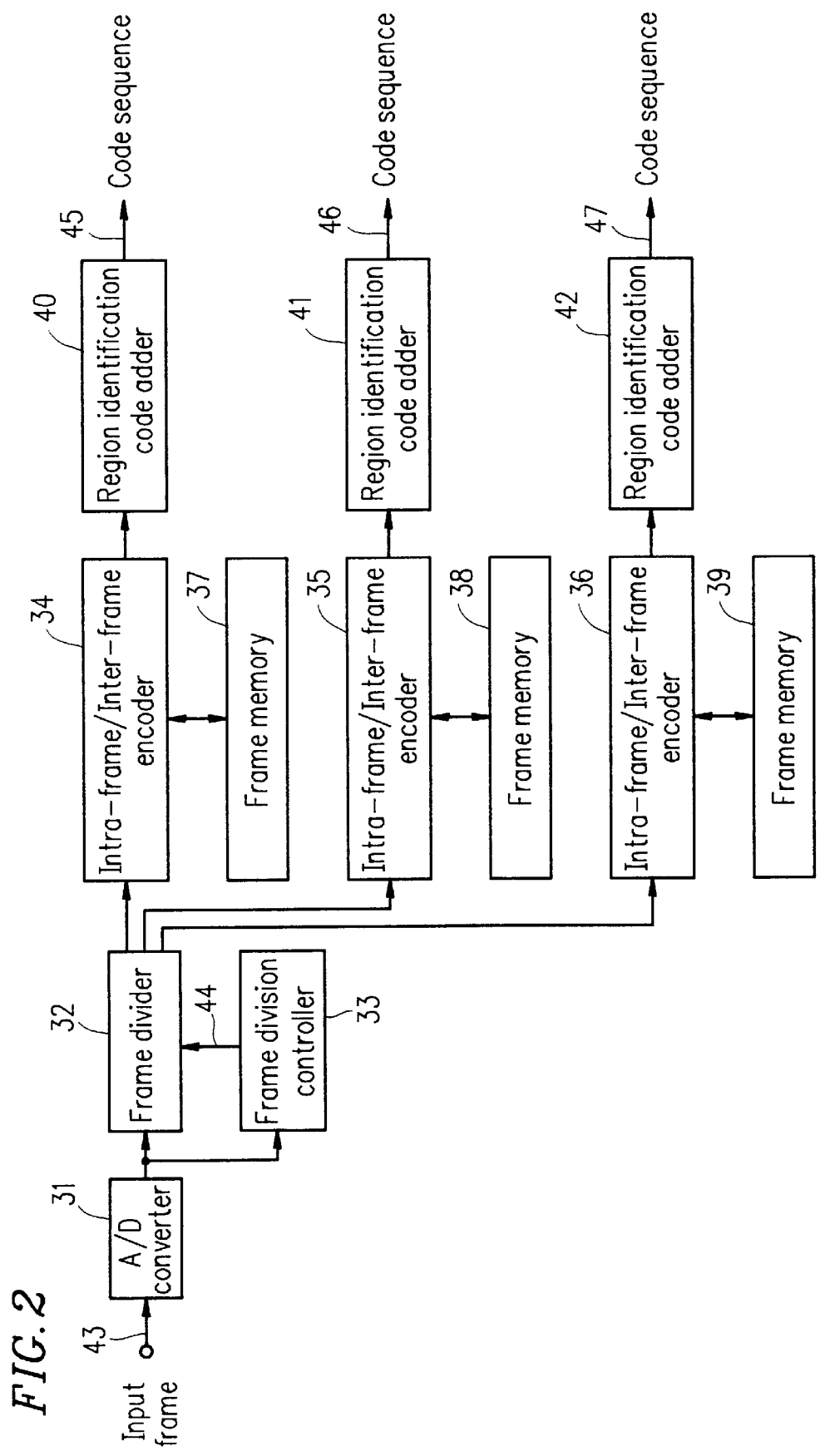
FIG. 2 is a block diagram of an example of a first encoding apparatus for moving pictures according to the present invention.

Next, a first example of an encoding apparatus for moving pictures will be described with reference to FIGS. 1 and 2. FIG. 2 is a block diagram of the encoding apparatus for moving pictures. The encoding apparatus includes an A/D converter 31, a frame divider 32, a frame division controller 33, intra-frame/inter-frame encoders 34, 35 and 36, frame memories 37, 38 and 39, and region identification code adders 40, 41 and 42.

First, the case where the frame 1 is inputted as an input frame 43 will be considered. After the input frame 43 is subject to the A/D conversion by the A/D converter 31, the input frame 43 is inputted to the frame divider 32. A method for dividing the frame 1 is determined by the frame division controller 33. The frame 1 is referred to by the other frames during the inter-frame prediction coding. At this time, the frame having the maximum distance from the frame 1 among the frames which directly and indirectly refer to the frame 1 is, as described above, the frame 2 or 6. The distance between the frame 1 and the frame 2 or 6 through the frame 4 is five frames. In this example, assuming that the range of the motion compensation between the continuous frames in terms of time is ±16 pixels in the vertical direction and ±16 pixels in the horizontal direction. In this case, the frame division controller 33 determines so that the frame 1 is divided into sub-frames 14, 15 and 16 obtaining the region by enlarging the both sides of the sub-frames 8, 9 and 10 by 16×5 pixels, respectively. Then, the frame division controller 33 outputs a frame division controlling signal 44 to the frame divider 32. Since the left side of the sub-frame 8 and the right side of the sub-frame 10 are the ends of the frame, the regions are not enlarged. The sub-frames 14, 15 and 16 are inputted into the intra-frame/inter-frame encoders 34, 35 and 36. Then, the intra-frame/inter-frame encoders 34, 35 and 36 perform the intra-frame coding on the inputted sub-frames 14, 15 and 16, respectively. The frame data of the sub-frames 14, 15 and 16 are stored in the frame memories 37, 38 and 39, respectively. The region identification code adders 40, 41 and 42 add the positional information of the respective regions in the frame to the respective code sequences generated by the intra-frame/inter-frame encoders 34, 35 and 36, thereby outputting code sequences 45, 46 and 47.

As the input frame 43, a frame 4 is subsequently inputted. Since the frame 4 is referred to by the other frames during the inter-frame coding, the frame 4 is encoded in the same manner as in the case of frame 1 described above.

Next, the case where the frame 2 is inputted to the frame divider 32 through the A/D converter 31 as the input frame 43 will be considered. Also in this case, the frame division controller 33 first determines a method for dividing the frame 2. Since the frame 2 is not referred to by the other frames during the inter-frame prediction coding, the region of each sub-frame is not enlarged. Therefore, the frame division controller 33 determines to divide the frame 2 into sub-frames 11, 12 and 13, thereby outputting the frame division control signal 44 to the frame divider 32. The sub-frames 11, 12 and 13 are inputted to the intra-frame/inter-frame encoders 34, 35 and 36. The inter-frame prediction coding is performed on the sub-frames 11, 12 and 13, using the sub-frames of the frames 1 and 4, respectively. If the sub-frame 12 is considered, the frame data of the sub-frames 15 and 22 are stored in the frame memory 38. Therefore, the intra-frame/inter-frame encoder 35 is capable of encoding the sub-frame 12, by accessing to the frame memory 38 alone. This is also applied to sub-frames 11 and 13. The region identification code adders 40, 41, and 42 add the positional information of respective regions in the frame to respective code sequences generated by the intra-frame/inter-frame encoders 34, 35 and 36, thereby outputting the code sequences 45, 46 and 47. The other frames are encoded in the same manner.

As described above, the encoding method shown in the example of FIG. 1 can be realized by the encoding apparatus for moving picture shown in FIG. 2.

Figure 3:
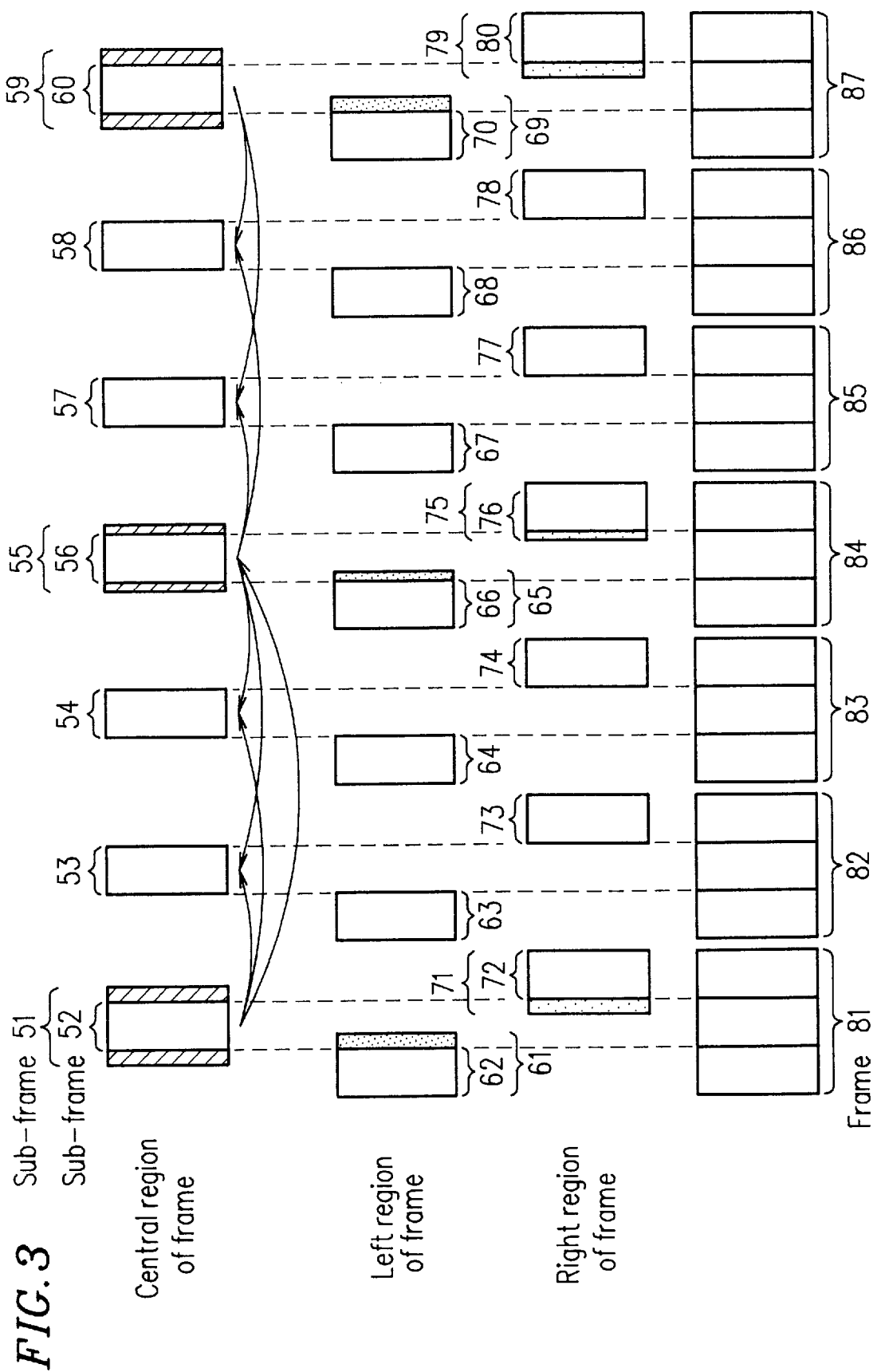
FIG. 3 is a schematic diagram showing a pattern of an example of a first method for decoding moving pictures according to the present invention.

Next, an example of a first decoding method for moving pictures according to the present invention will be described with reference to FIG. 3. In this figure, the case where the frame is vertically divided into three regions is shown. FIG. 3 shows the sequence of encoded sub-frames regarding the central regions, the left regions and the right regions of the frame in descending order. The sub-frames arranged in a column belong to the same frame.

A method for decoding the sub-frames of the central regions of the frame will be described. First, the intra-frame decoding is performed on a sub-frame 51. By the method described in the example of FIG. 1, the sub-frame 51 has the region obtained by enlarging a sub-frame 52, which is divided so that the divided regions do not overlap each other, by the range referred to by the other sub-frames. Next, a sub-frame 55 is decoded. In this case, it is sufficient to refer to the frame data of the sub-frame 51. Therefore, it is not necessary to obtain the frame data for reference from the sub-frames 61 and 71 adjacent to the sub-frame 51. By the method described in the example of FIG. 1, the sub-frame 55 has the region obtained by enlarging a sub-frame 56, which is divided so that the divided regions do not overlap each other, by the range referred to by the other sub-frames, as the sub-frame 51. Subsequently, sub-frames 53 and 54 are decoded in this order. Also in this case, it is possible to decode the sub-frames 53 and 54 by referring to the frame data of the sub-frames 51 and 55 alone. In the same manner, sub-frames 59, 57 and 58 are decoded in this order.

The above described decoding procedure is applicable to both left and right regions of the frame in the same manner. That is, in the left regions, sub-frames 61, 65, 63, 64, 69, 67 and 68 are decoded in this order, and in the right regions, sub-frames 71, 75, 73, 74, 79, 77 and 78 are decoded in this order. Also in this case, the reference frame used for decoding is a decoded frame of the same region alone.

Next, the decoded sub-frames of each region are synthesized, then the entire frame is reproduced. Regarding the frame having the divided regions which overlap each other, the entire frame is reproduced after the overlapping portions between the sub-frames are specified and then eliminated. For example, when the sub-frames 51, 61 and 71 are to be synthesized, the overlapping portions thereof is eliminated and then the sub-frames 52, 62 and 72 are synthesized. As a result, a frame 81 is obtained. Likewise, for the sub-frames 55, 65 and 75, a frame 84 is obtained by synthesizing the sub-frames 56, 66 and 76, and for the sub-frames 59, 69, and 79, a frame 87 is obtained by synthesizing the sub-frames 60, 70 and 80. Regarding the frames which divide the frame so as not to overlap each other, each sub-frame is synthesized without any elimination. For example, a frame 82 is obtained by synthesizing the sub-frames 53, 63 and 73 without any elimination. As described above, it is possible to reproduce the sequence of frames 81, 82, 83, 84, 85, 86 and 87.

For specifying the overlapped portions, the following methods may be used, for example. One method for obtaining a size of the overlapped portions is to decode the header of the frame when decoding. Since the header of the frame indicates the specific type of encoding, the reference relationship between the frames can be determined by the header. As a result, the size of the overlapped portions can be obtained. Another method is to add information about a size of the frame before enlarging to the header of the frame when encoding, as adopted by MPEG standard. When decoding, the size of the overlapped portions can be known by the difference between the frame size before enlarging which is obtained by the header and a frame size after enlarging which is obtained with actual decoding.

As described above, it is understood that the first decoding method for moving pictures according to the present invention makes it possible to decode the code sequences generated by using the first encoding method for moving picture according to the present invention without referring to the decoding frame data of the other regions.

Figure 4:
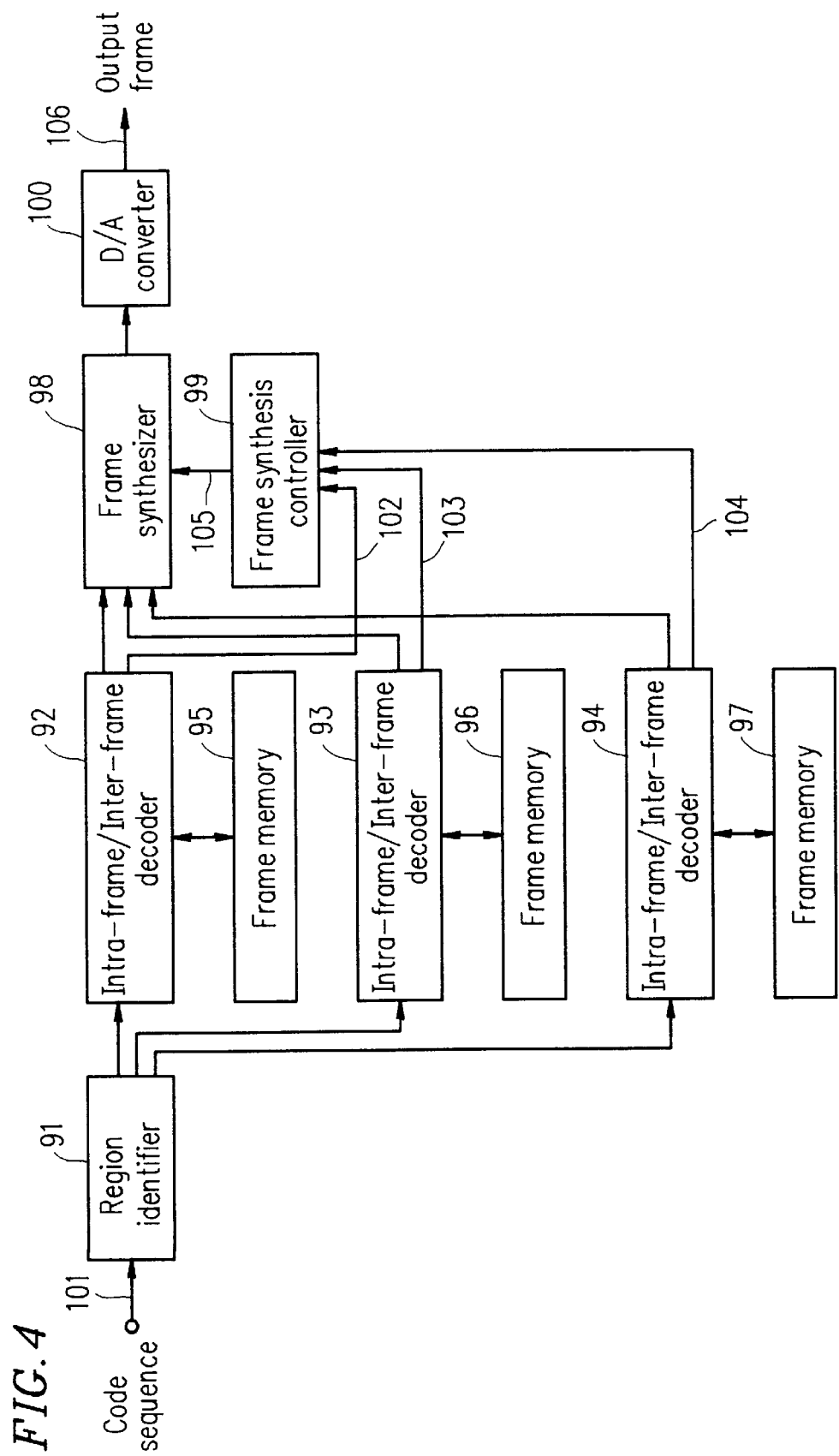
FIG. 4 is a block diagram of an example of a first decoding apparatus for moving pictures according to the present invention.

Next, a first decoding apparatus for moving pictures according to the present invention will be described with reference to FIGS. 3 and 4. The decoding apparatus includes a region identifier 91, intra-frame/inter-frame decoders 92, 93 and 94, frame memories 95, 96 and 97, a frame synthesizer 98, a frame synthesis controller 99 and a D/A converter 100.

First, a code sequence 101 of each region generated in the example of the first encoding apparatus for moving pictures according to the present invention is inputted in the region identifier 91. The region identifier 91 judges, from the region identification code added to the code sequence, the region from which the input code sequence is encoded. Then, from the result of judgement, the region identifier 91 determines the intra-frame/inter-frame decoders to which the code sequence is to be inputted. In this case, the code sequences of the left region, the central region and the right region of the frame are processed by the intra-frame/inter-frame decoders 92, 93 and 94, respectively. First, the procedure to decode the sequence of the central region of the frame is described. The code sequence of the sub-frame 51 is inputted to the intra-frame/inter-frame decoder 93 and then is decoded by the intra-frame decoding. The decoded sub-frame 51 is stored in the frame memory 96. In this case, the sub-frame 51 has the region obtained by enlarging the sub-frame 52 which is divided so that the divided region do not overlap each other by the range to which the other sub-frames refer, by the method described in the example of FIG. 1.

Next, the code sequence of the sub-frame 55 is inputted into the intra-frame/inter-frame decoder 93 and then decoded by the intra-frame/inter-frame decoding. At this time, it is possible to decode the code sequence only by using the frame data of the sub-frame 51 which is stored in the frame memory 96 alone as the reference frame. The intra-frame/inter-frame decoder 93 is not required to access the frame memories 95 and 97. Then, the decoded sub-frame 55 is stored in the frame memory 96. The sub-frame 55 also has the region obtained by enlarging the sub-frame 56 which is divided so as not to overlap each other by the range to which the other sub-frames refer.

Subsequently, the intra-frame/inter-frame decoder 93 decodes the code sequences of the sub-frames 53 and 54 in this order. At this time, the code sequences can be decoded only by using the frame data of sub-frames 51 and 55 which are stored in the frame memory 96 as the reference frame. Therefore, the intra-frame/inter-frame decoder 93 is not required to access the frame memories 95 and 97. Then, the decoded sub-frames 53 and 54 are stored in the frame memory 96. Likewise, the sub-frames 59, 57 and 58 are decoded in this order.

For the code sequences of the left regions of the frame, the intra-frame/inter-frame decoder 92 decodes the code sequences by accessing the frame memory 95 alone, thereby obtaining the sub-frames 61, 63, 64, 65, 67, 68 and 69. For the code sequences of the right regions of the frame, the intra-frame/inter-frame decoder 94 decodes the code sequences by accessing the frame memory 97 alone, thereby obtaining the sub-frames 71, 73, 74, 75, 77, 78 and 79.

The frame synthesizer 98 synthesizes the thus decoded sub-frames into the entire frame. At this time, the frame synthesis controller 99 obtains the information 102, 103 and 104 concerning the amount of overlapping portions when the decoded sub-frames divides the frame from the intra-frame/inter-frame decoders 92, 93 and 94. With this information, the frame synthesis controller 99 specifies the overlapped portions and then controls a synthesis method of the frame synthesizer 98.

For specifying the overlapped portions, the frame synthesizer 98 may use the following methods, for example. One method for obtaining a size of the overlapped portions is to decode the header of the frame when decoding. Since the header of the frame indicates the specific type of encoding, the reference relationship between the frames can be determined by the header. As a result, the size of the overlapped portions can be obtained. Another method is to add information about a size of the frame before enlarging to the header of the frame when encoding, as adopted by MPEG standard. When decoding, the size of the overlapped portions can be known by the difference between the frame size before enlarging which is obtained by the header and a frame size after enlarging which is obtained with actual decoding.

Regarding the frames dividing the frame so that the divided regions overlap each other, the entire frame is reproduced after the overlapping portions between the sub-frames are eliminated. When the sub-frames 51, 61 and 71 are synthesized, the frame synthesizer 98 receives a frame synthesis control signal 105 so that the frame synthesizer 98 eliminates the overlapping portions and synthesizes the sub-frames 52, 62 and 72. With this operation, it is possible for the frame synthesizer 98 to obtain the frame 81. Likewise, for the sub-frames 55, 65 and 75, the frame 84 is obtained by synthesizing the sub-frames 56, 66 and 76. For the sub-frames 59, 69 and 79, the frame 87 is obtained by synthesizing the sub-frames 60, 70 and 80. For the frames dividing the frame so that the divided regions do not overlap each other, the frame synthesis controller 99 sends the frame synthesis control signal 105 to the frame synthesizer 98 so as to synthesize the sub-frames 53, 63 and 73, thereby obtaining the frame 82 by synthesizing without elimination. In the above described manner, the sequence of frames 81, 82, 83, 84, 85, 86 and 87 can be reproduced. The frames synthesized by the frame synthesizer 98 are converted by the D/A converter 100 to be an output frame 106.

As described above, the first decoding apparatus for moving pictures according to the present invention makes it possible to decode the code sequences generated by using the first encoding apparatus for moving pictures according to the present invention without accessing the frame memory which stores the decoded frame data of the other regions.

Next, a second encoding method, a second encoding apparatus, a second decoding method and a second decoding apparatus according to the present invention will be described. Hereinafter, an encoding method using a set of pixels of approximately 16×16 (hereinafter, referred to as macro block) such as H. 261 and MPEG as a unit will be considered. The case where the unit of the picture is a frame and the picture is divided into three regions is taken as an example.

Figure 5A:
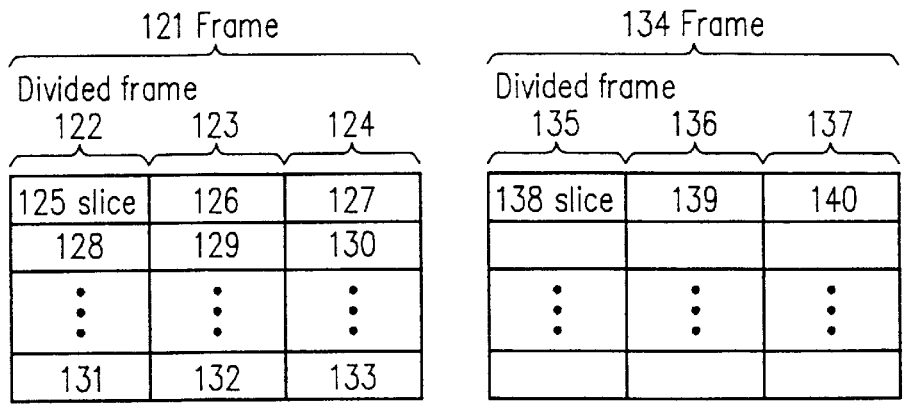
FIGS. 5A, 5B and 5C are schematic diagrams showing patterns of a first example of a second encoding method for moving pictures according to the present invention.
Figure 5B:
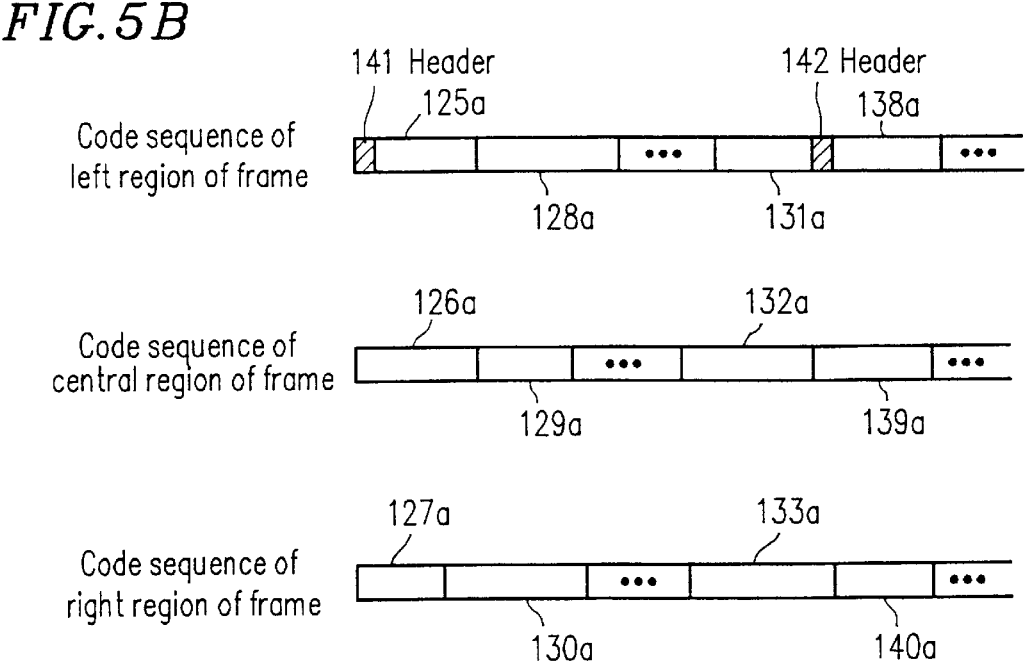
Figure 5C:
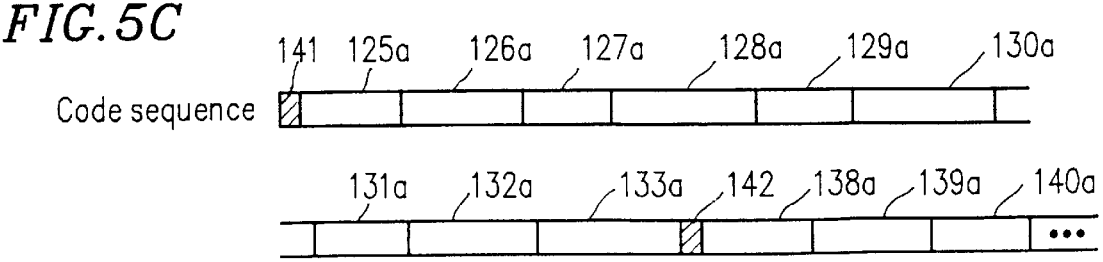

First, a first example of a second encoding method for moving pictures according to the present invention will be described. FIGS. 5A, 5B and 5C are a schematic pattern showing a method for encoding frames 121 and 134 in the moving pictures. Herein, the frames 121 and 134 are continuous frames arranged in the order of code sequences.

First, each frame is vertically divided into three regions. By this operation, the frames 121 and 134 are divided into divided frames 122, 123 and 124, and the divided frames 135, 136 and 137, respectively. Encoding is performed on each divided region. Each divided frame is further divided into a set of horizontally continuous macro blocks (hereinafter, referred to as "slices") as a unit for generating code sequences. In this case, a slice is as long as a divided frame in the horizontal direction. By this operation, the divided frame 122 is further divided into slices 125, 128 . . . and finally a slice 131. The divided frames 123, 124, 135, 136 and 137 are divided into slices in the same manner. After this division, by the divided frame 123, the slices 126, 129, . . . and 132, by the divided frame 124, the slices 127, 130, . . . and 133, by the divided frame 135, the slices 138, . . . , by the divided frame 136, the slices 139, . . . , and by the divided frame 137, the slices 140, . . . are obtained, respectively.

The divided frame 122 includes the upper left end macro block of the frame, that is, the top macro block of the frame 121. In the case where the header is added as in the case where the frame 121 is the top frame of the code sequences for moving picture or is the top frame of the set of frames, the header suitable for each case is first generated. Regardless of whether the header is generated or not, a header 141 of the frame 121 is generated. Subsequently, the slices 125 and 128 are encoded so as to be code sequences 125a and 128a, respectively. Provided that a header of the slice is included in the code sequence of each slice. Thereafter, the slices are sequentially encoded, and finally the slice 131 is encoded to be a code sequence 131a.

Since the divided frame 123 does not include the upper left macro block of the frame, a header of the frame is not generated. Therefore, the slice 126 is first encoded to be a code sequence 126a, and then the slice 129 is encoded to be a code sequence 129a. Thereafter, the slices are sequentially encoded, and finally the slice 132 is encoded to be a code sequence 132a. Since the divided frame 124 does not include the upper left macro block of the frame as the divided frame 123, a header of the frame is not generated. Thus, the code sequences 127a, 130a, . . . are sequentially generated, and finally a code sequence 133a is generated.

Next, the divided frames 135, 136 and 137 are encoded in the same manner as the divided frames 122, 123 and 124. At this time, since the divided frame 135 includes the upper left macro block of the frame, a header 142 is added just before a code sequence 138a of the top slice 138. Since the divided frame 135 belongs to the same positional region as the divided frame 122, the code sequence of the divided frame 135 is generated after the code sequence of the divided frame 122. A header of the frame is not added just before a code sequence 139a of the top slice 139 of the divided frame 136 and a code sequence 140a of the top slice 140 of the divided frame 137.

With the above operation, the code sequences of respective divided regions are generated as shown in FIG. 5B. The code sequences of the left region of the frames are code sequence in the case where the moving pictures of the divided frames are encoded. The encoded sequences of the other regions are code sequences obtained by eliminating headers of a hierarchical level of frame or higher levels from the code sequences of the case where moving pictures of the divided frames are encoded. Here, "hierarchical levels" consist of, for example, a slice, a sub-frame, a frame, and a group of frames in order of increasing data size. And greater size of data is referred to as a higher level.

Furthermore, these code sequences are combined together at the boundary of the frame division and between the frames. In the frame 121, the code sequences 125a, 126a, 127a and 128a corresponding to the slices 125, 126, 127 and 128, respectively, are combined together in this order. The header 142 of the frame 134 is added after the code sequence 133a of the last slice 133 of the frame 121, and the code sequence 138a of the head slice 138 is added after the header 142. With this operation, it is possible to generate a code sequence shown in FIG. 5C. The order of the code sequence is the same as in the case where the frames 121 and 134 are encoded without being divided.

Figure 6A:
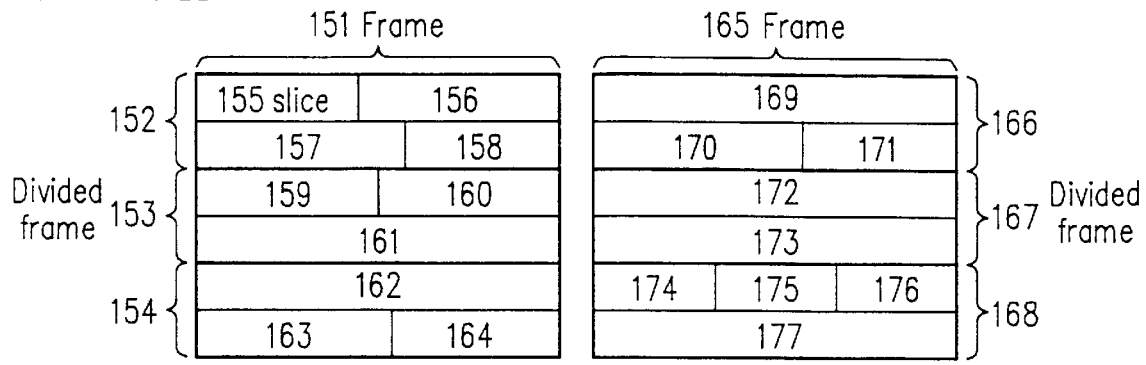
FIGS. 6A, 6B and 6C are schematic diagrams showing patterns of a second example of the second encoding method for moving pictures according to the present invention.
Figure 6B:
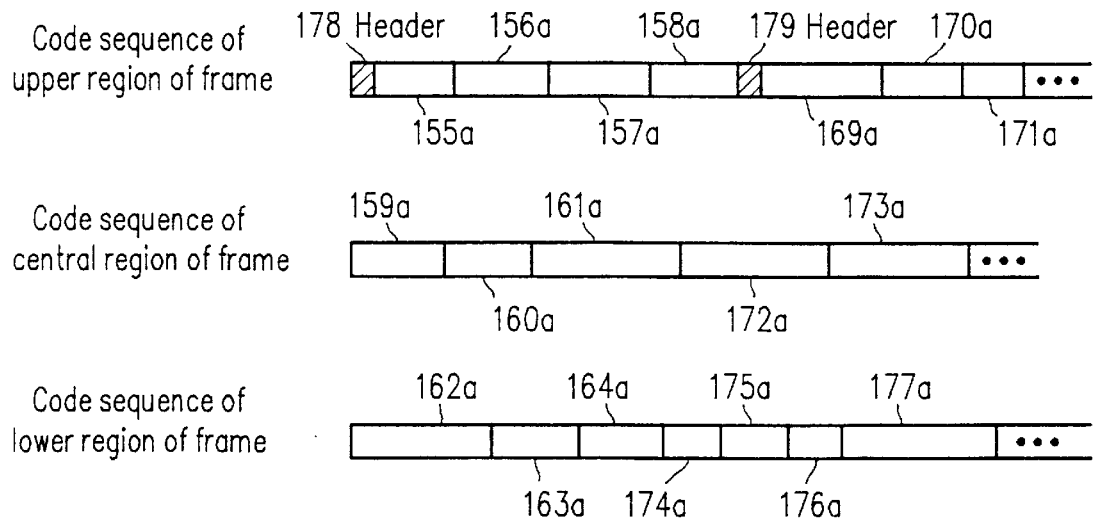
Figure 6C:
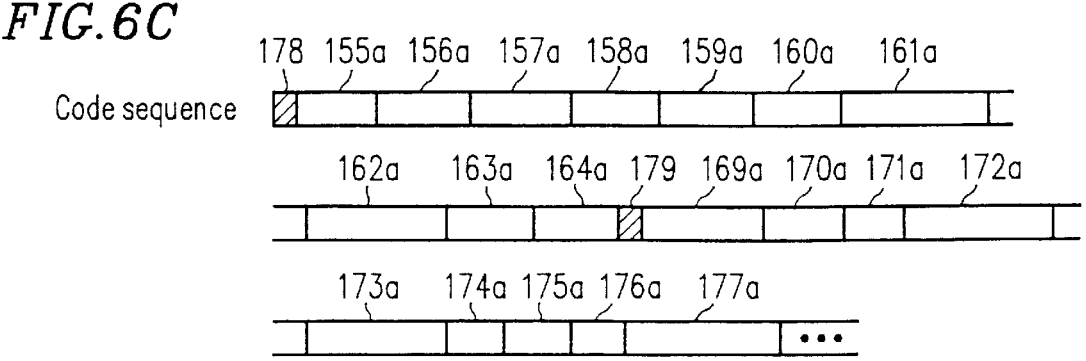

Next, the second example of the second decoding method for moving pictures according to the present invention will be described with reference to FIGS. 6A, 6B and 6C. FIGS. 6A, 6B and 6C are schematic diagrams showing a method for encoding the frames 151 and 165 in moving pictures.

First, each frame is horizontally divided into three regions. With this operation, the frames 151 and 165 are divided into divided frames 152, 153 and 154, and divided frames 166, 167 and 168, respectively. Encoding is performed on each divided region. At this moment, each divided frame is further divided into slices as a unit for generating a code sequence of each divided region. With this operation, the divided frame 152 is further divided into slices 155, 156, 157 and 158 in this order. The divided frames 153, 154, 166, 167 and 168 are divided into slices, respectively, in the same manner as described above.

The divided frame 152 includes the upper left macro block of the frame 151. In the case where the header is added as in the case where the frame 151 is the top frame of the code sequence of moving pictures or is the top frame of the set of frames, the header suitable for each case is first generated. Regardless of whether the header is generated or not, a header 178 of the frame 151 is generated. Subsequently, the slices 155, 156, 157 and 158 are encoded in this order so as to be code sequences 155a, 156a, 157a and 158a, respectively. Provided that a header of the slice is included in the code sequence of each slice.

Since the divided frame 153 does not include the upper left macro block of the frame, a header of the frame is not generated. Therefore, the slice 159 is first encoded to be a code sequence 159a, and then the slices 160 and 161 are encoded to be code sequences 160a and 161a, respectively. Since the divided frame 154 does not include the upper left macro block of the frame as the divided frame 153, a header of the frame is not generated. Thus, the code sequences 162a, 163a and 164a are sequentially generated.

Next, the divided frames 166, 167 and 168 of the frame 165 are encoded in the same manner as the divided frames 152, 153 and 154. At this time, since the divided frame 166 includes the upper left macro block of the frame 165, a header 179 of the frame 165 is added just before a code sequence 169a of the top slice 169. A header of the frame is not added just before a code sequence 172a of the top slice 172 of the divided frame 167 and a code sequence 174a of the top slice 174 of the divided frame 168.

With the above operation, the code sequences of respective divided regions are generated as shown in FIG. 6B. The code sequences of the upper region of the frames become a code sequence of the case where the moving pictures of the divided frames are encoded. The encoded sequences of the other regions are code sequences obtained by eliminating headers of a hierarchical level of frame or higher levels from the code sequences of the case where moving pictures of the divided frames are encoded.

Furthermore, these code sequences of the respective slices are combined together at the boundary of the frame division and between the frames. In the frame 151, the code sequences 158a corresponding to the slice 158 is followed by the code sequence 159a corresponding to the slice 159. Also, the code sequence 161a corresponding to the slice 161 is followed by the code sequence 162a corresponding to the slice 162. The header 179 of the frame 165 is added after the code sequence 164a of the end slice 164, and the code sequence 169a of the head slice 169 is added after the header 179. With this operation, it is possible to generate a code sequence shown in FIG. 6C. The order of the code sequence is the same as in the case where the frames 151 and 165 are encoded without being divided.

As described above, it is understood that code sequences regarded as encoded moving pictures of the entire frame in terms of syntax can be generated by the following operation. A frame is divided into a plurality of regions, and a code sequence separated by the boundary of the frame division and between the frames is generated from each divided frame. For the divided frame including the upper left portion of the frame, a header of the frame is added to the top of the frame for generating a code sequence. The divided code sequences are combined together at the boundary of the frame division and between the frames in the encoding order of frames without being divided.

Figure 7:
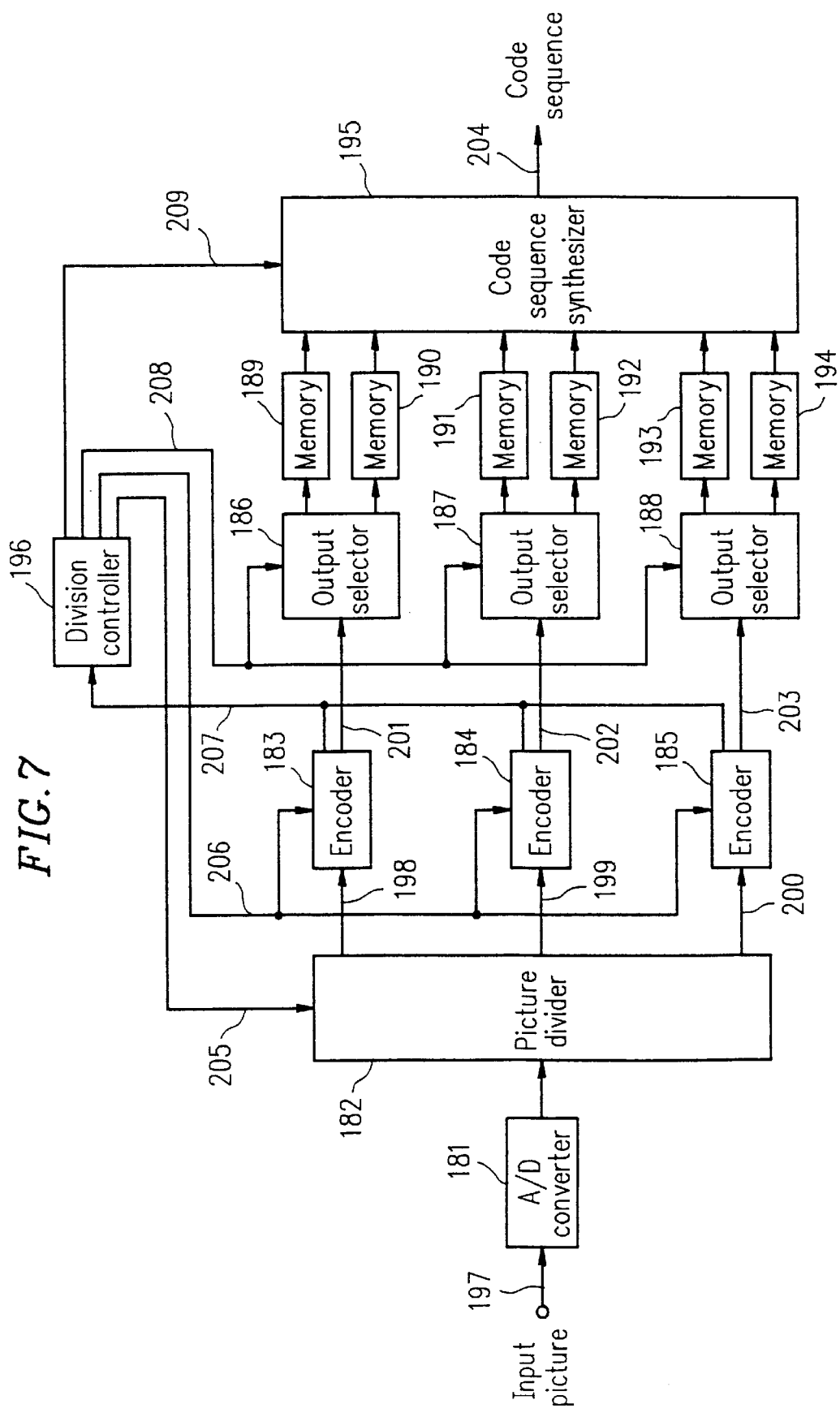
FIG. 7 is a block diagram of an example of a second encoding apparatus according to the present invention.

Next, an example of a second encoding apparatus for moving pictures according to the present invention will be described with reference to FIGS. 5A, 5B, 5C and 7. FIG. 7 is a block diagram of the encoding apparatus for moving pictures. The encoding apparatus includes an A/D converter 181, a picture divider 182, encoders 183, 184 and 185, output selectors 186, 187 and 188, memories 189, 190, 191, 192, 193 and 194, a code sequence synthesizer 195, and a division controller 196.

First, after being subject to A/D conversion by the A/D converter 181, an input picture 197 is inputted to the picture divider 182. The picture divider 182 determines a method for dividing the frames based on a picture division control signal 205 outputted by the division controller 196. Then, the picture divider 182 divides the input frame, thereby outputting divided picture signals 198, 199 and 200. The case where the frames are vertically divided into three regions, as in FIG. 5A will be considered. The divided picture signals are 198, 199 and 200 from the left region of the frame. Thus, the divided picture signals 198, 199 and 200 includes divided frames 122 and 135, 123 and 136, and 124 and 137, respectively. The divided picture signals 198, 199 and 200 are inputted into the encoders 183, 184 and 185, respectively. The encoders 183, 184 and 185 receive these divided picture signals as an encoding control signal 206 from the division controller 196, thereby encoding the divided picture signals. The encoding control signal 206 indicates the encoding condition such as the information included in the header of a hierarchical level of frame or higher levels. For example, in the case of MPEG2, the information includes the maximum range of motion compensation, a quantizing matrix, and the like. The encoders 183, 184 and 185 encode the regions under the same condition based on the encoding control signal 206. Since the encoder 183 encodes the region including the upper left macro block of the frame, headers for the frames are added to every top of the frame. In the case where the frame to be encoded is the top of the moving picture or the top frame of a set of frames, a header is further added before the frame. For example, when the divided frame 122 is encoded, the header 141 of the frame 121 is generated.

With the operation described above, code sequences 201, 202 and 203 are generated for the divided picture signals. The structure of the code sequences is as shown in FIG. 5B. The code sequences 201, 202 and 203 correspond to the code sequences of the left region, the central region and the right region in the frame, respectively. The memories to which these code sequences are to be outputted are selected by the output selectors 186, 187 and 188. This state is described, taking the code sequence 201 generated from the encoder 183 as an example. The encoder 183 outputs a code sequence separating signal 207 to the division controller 196 after outputting the last code sequence at the boundary of the frame division or the divided frame. Receiving the code sequence separating signal 207, the division controller 196 sends an output selecting control signal 208 to the output selector 186 corresponding to the encoder 183. The output selector 186 selects the memory to which the code sequence 201 is outputted based on the output selecting control signal 208. For example, if the output selector 186 outputs the code sequence 201 to the memory 189 before receiving the output selecting control signal 208, the output selector 186 outputs the code sequence 201 to the memory 190 after receiving the output selecting control signal 208. If the code sequence 125a of the slice 125 is output ted to the memory 189, the code sequence 128a of the slice 128 is outputted to the memory 190.

In the above described manner, the code sequences generated by the encoder 183 are divided by the boundary of the frame division and between the frames and then inputted to the memories. With the similar operation, the code sequence 202 generated from the encoder 184 is inputted to memories 191 and 192 by the output selector 187, and the code sequence 203 generated from the encoder 185 is inputted to the memories 193 and 194 by the output selector 188.

The code sequences inputted to the memories 189 to 194 in the above manner are inputted to the code sequence synthesizer 195 and then outputted as a single code sequence 204. The code sequence synthesizer 195 combines the code sequences together, based on a code sequence synthesis control signal 209. The code sequence synthesis control signal 209 indicate to combine the code sequences in the memory in the order of the case where the frame is not divided, in accordance with the method for dividing the frame. For example, if the code sequences 125a, 128a, 126a, 129a, 127a and 130a of the slices are stored in the memories 189 to 194, respectively, the code sequence synthesizer 195 reads and outputs the code sequences 125a, 126a, 127a, 128a, 129a and 130a in this order. With this operation, the code sequence is generated as shown in FIG. 5C.

As described above, the encoding apparatus for moving pictures shown in FIG. 7 makes it possible to produce the code sequence having the same syntax as that of the code sequence of the case where the picture is not divided while dividing the picture and performing the encoding process by a plurality of encoders at the same time.

Next, a first example of a second decoding method for moving pictures will be described with reference to FIGS. 8A to 8D. FIGS. 8A to 8D show a method for decoding the code sequence by dividing a code sequence of a moving picture into a plurality of parts. In this example, the case where the code sequence for two frames in the input code sequence is decoded is shown.

Figure 8A:
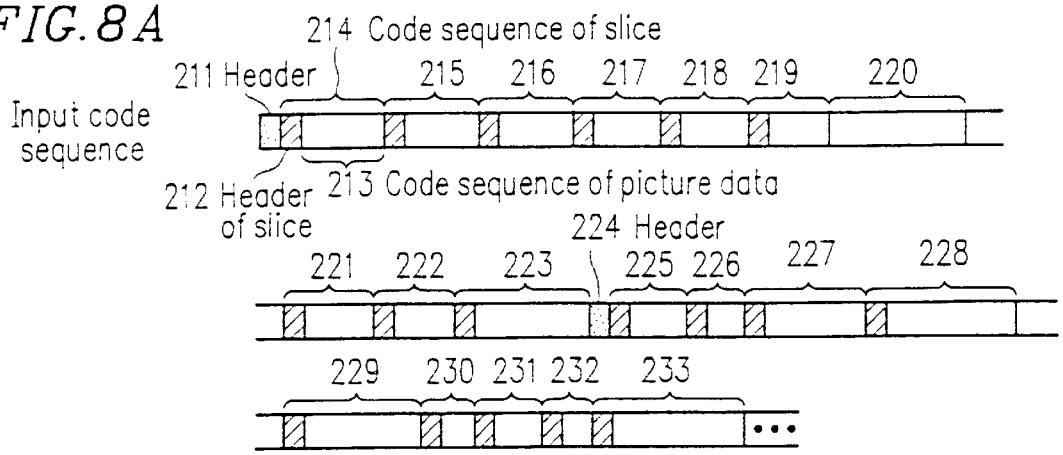
FIGS. 8A, 8B, 8C and 8D are schematic diagrams showing patterns of a first, a second and a third examples of a second decoding method for moving picture according to the present invention.

FIG. 8A shows an input code sequence. Headers 211 and 224 are headers of a hierarchical level of frame or higher levels. The code sequence of a slice is divided into a header and a code sequence of the picture data. For example, a code sequence of the slice 214 consists of a header 212 of the slice and a code sequence 213 of the picture data. Code sequences 215 to 223 and 225 to 233 of the other slices have the same configuration. The input code sequences are divided into three so that the divided code sequences correspond to the horizontally divided frames. This division is performed by decoding the positional information on the picture included in the headers of the slices. The header of the slice is searched from the top of the input code sequence. At the time when the header is detected, the positional information of the slice is obtained. Then, the divided frame to which the slice belongs is determined, based on the positional information. At this time, in the case where the slice belongs to the different divided frame from the one to which the previous slice belongs, the code sequences are divided at the top of the header of the slice. In the case where the slices belong to the same divided frame, the code sequences are not divided, provided that headers 211 and 224 of a hierarchical level of frame or higher levels are included in the code sequence of the uppermost region of the frame.

Figure 8B:
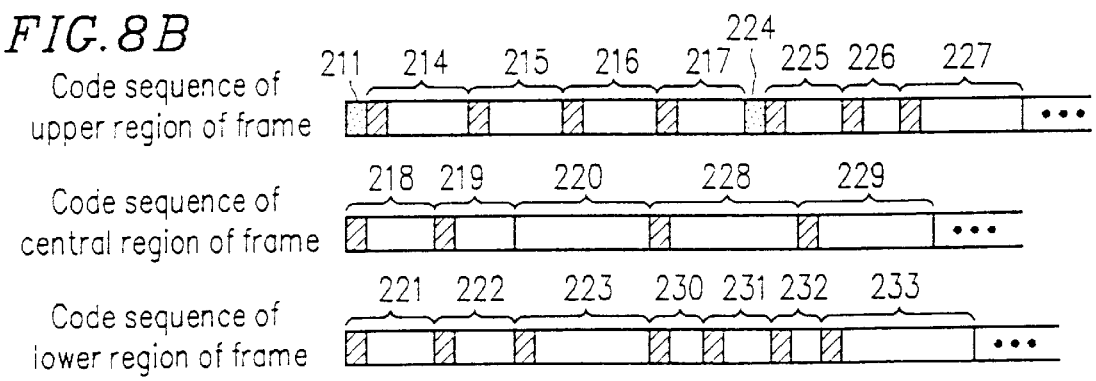
Figure 8C:
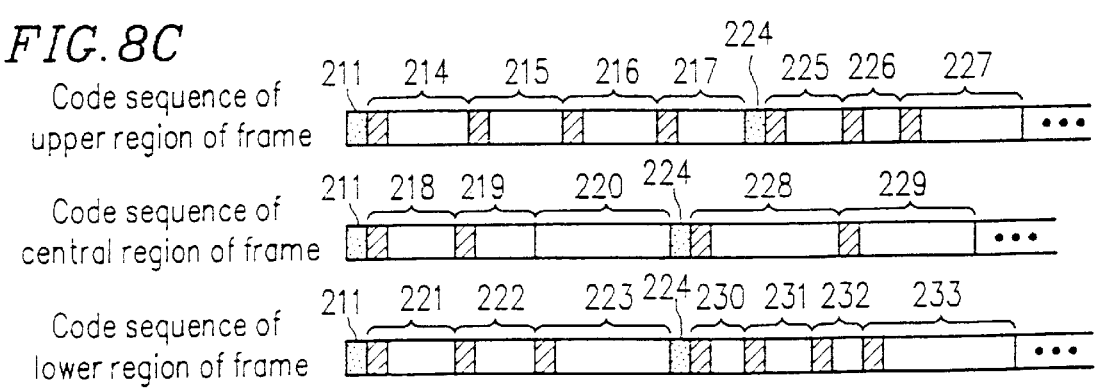
Figure 8D:
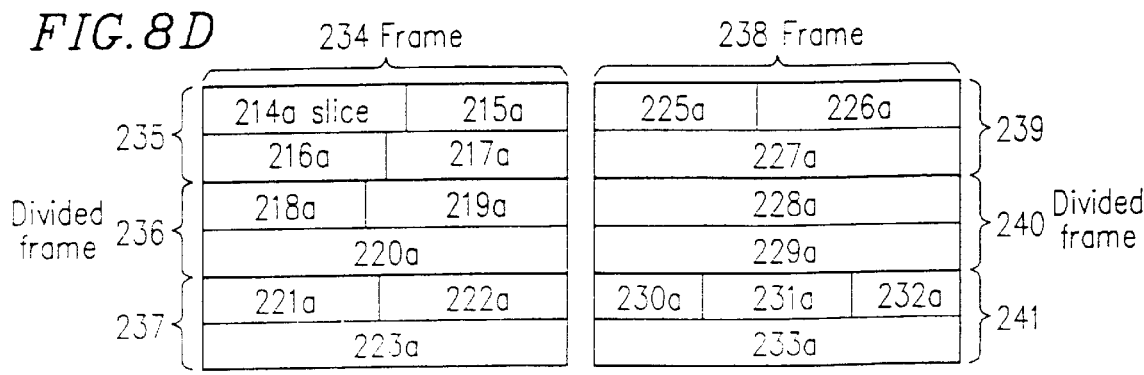

The input code sequence is divided so as to correspond to the divided frames 235 to 237 and 239 to 241 of FIG. 8D. First, the header 212 of the slice is detected for the input code sequence of FIG. 8A, thereby decoding the positional information. From this operation, the code sequence 214 of the slice is found to belong to the divided frame 235. Likewise, the code sequences 215 to 217 of the slices is found to belong to the divided frame 235 by decoding the positional information of the header. Therefore, the code sequences 214 to 217 of the slices are not divided. Next, the header of the code sequence 218 of the slice is detected and the positional information is decoded. With this operation, the code sequence 218 of the slice is found to belong to the divided frame 236 and therefore belong to a different region from the previous region. Thus, the code sequence is divided at the top of the header of the code sequence 218 of the slice. Since the code sequences 218 to 220 of the slices belong to the divided frame 236, the code sequences are not divided. In the same manner, the code sequences are divided at the top of the header of the code sequence 221 of the slice. Thereafter, the code sequence is divided at the top of the header 224 and the top of the headers of the slices 228 and 230. As a result, three divided code sequences corresponding to the respective regions as shown in FIG. 8B are obtained.

Subsequently, each divided code sequence is decoded. The divided frames 235 and 239 are obtained by decoding the code sequence of the upper region, the divided frames 236 and 240 are obtained from the code sequence of the central region, and the divided frames 237 and 241 are obtained by decoding the code sequence of the lower region. Frames 234 and 238 are obtained by synthesizing the thus obtained divided frames 235, 236 and 237, and the divided frames 239, 240 and 241, respectively.

Next, a second example of the second decoding method for moving pictures will be described with reference to FIGS. 8A to 8D. The second example is different from the first example in that the input code sequence of FIG. 8A is divided into code sequences corresponding to respective regions as shown in FIG. 8C. This method will be described below.

In the case where headers of the input code sequence are searched and the headers of a hierarchical level of frame or higher levels are detected, the headers are distributed to code sequences of the respective regions. This operation continues until the header of the slice is detected. With this operation, the header of a hierarchical level of frame or higher levels is included in each divided code sequence. Thereafter, when the header of the slice is detected, the code sequences are divided as in the first decoding method, based on the positional information of the headers of the slices.

The case where the input code sequence is divided so as to correspond to the divided frames 235 to 237 and 239 to 241 shown in FIG. 8D will be described. In the input code sequence of FIG. 8A, the header 211 is first detected. Since the header 211 is a header of a hierarchical level of frame or higher levels, the header is distributed to the code sequence of each region. A method for dividing the code sequences 214 to 223 is as described in the first example. Next, when the header 224 is detected, the header is distributed to the code sequence of each region since the header 224 is a header of a hierarchical level of frame or higher levels. Thereafter, the code sequences 225 to 233 are divided by the method described in the first example. As a result, code sequences of respective regions as shown in FIG. 8C are obtained. A method for obtaining a moving picture of the entire picture by synthesizing the divided frames obtained by encoded the code sequences of FIG. 8C is the same as that in the first example.

From the above description, it is understood that the moving picture of the entire picture can be reproduced by the following operation. The divided code sequences are generated by using the code sequence of the moving picture as an input and dividing the code sequence so as to correspond to respective regions of the divided pictures. The divided pictures are decoded for respective divided code sequences, and the thus obtained divided picture groups are synthesized.

Figure 9:
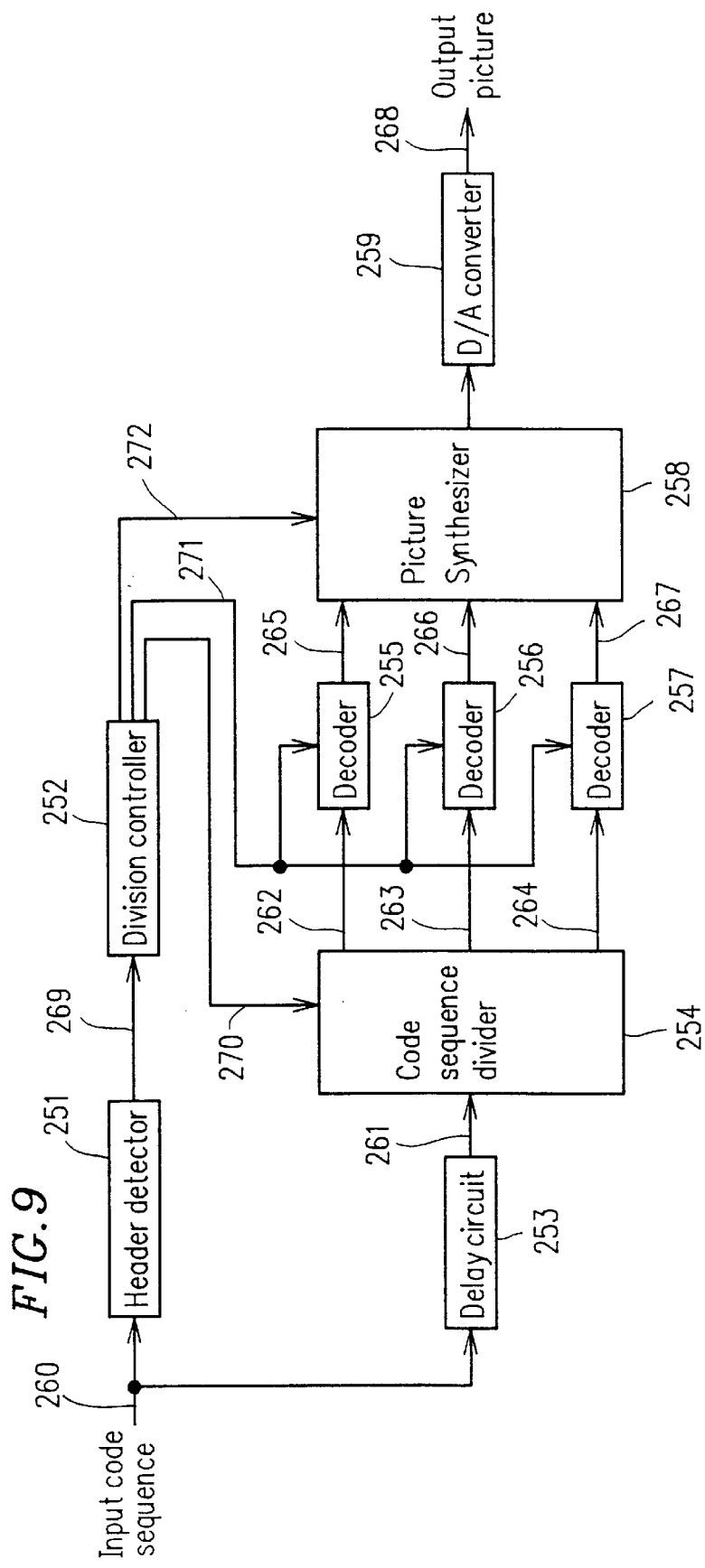
FIG. 9 is a block diagram showing a first and a second examples of a second decoding apparatus for moving pictures according to the present invention.

Next, a first example of a second decoding apparatus for moving pictures according to the present invention will be described with reference to FIGS. 8A, 8B, 8D and 9. FIG. 9 is a block diagram of the decoding apparatus for moving pictures. The decoding apparatus includes a header detector 251, a division controller 252, a delay circuit 253, a code sequence divider 254, decoders 255, 256 and 257, a picture synthesizer 258 and a D/A converter 259. In this example, the following case will be considered. The frame is horizontally divided into three regions so that the three regions correspond to the divided frames 235 to 237 of FIG. 8D. The upper region, the central region, and the lower region of the frame are decoded by the decoders 255, 256 and 257, respectively.

An input code sequence 260 is inputted into the header detector 251 and the delay circuit 253 at the same time. The header detector 251 searches and decodes the headers of a hierarchical level of frame or higher levels of the input code sequence 260 and searches the headers of the slices. When the headers of slices are detected, the positional information of the headers is decoded. Then, the decoded positional information is inputted to the division controller 252 as header information 269. The division controller 252 outputs a code sequence division control signal 270 to the code sequence divider 254 when the slice detected by the header detector 251 belongs to the different divided region from the one to which the slice just previous belongs, based on the predetermined method for dividing the frame. On receiving the code sequence controlling signal 270 from the division controller 252, the code sequence divider 254 selects the destination to which the input code sequence 261 passing through the delay circuit 253 is outputted. In the case where the code sequence divider 254 outputs the input code sequence 261 as a divided code sequence 262 to the decoder 255, if the code sequence division control signal 270 is inputted from the division controller 252, the destination to which the input code sequence 261 is outputted is set to the decoder 256. As a result, the input code sequence 261 is outputted to the decoder 256 as the divided code sequence 263. When the destination to which the input code sequence 261 is outputted is selected, the delay circuit 253 delays the timing of the input code sequence 260 to be inputted to the code sequence divider 254 such that the header of the slice detected by the header detector 251 is included in the divided code sequence which is outputted immediately after the destination is selected.

The above operation in the case where the input code sequence of FIG. 8A is inputted will be described. In this case, the header detector 251 first decodes the header 211. The header 211 is inputted to the decoder 255. Subsequently, the header of the slice is searched to detect the header 212 of the slice. The code sequence 214 of the slice is found to belong to the divided frame 235 by decoding the positional information of the header 212 of the slice. Therefore, the code sequence divider 254 outputs the input code sequence 261 following the header 211 to the decoder 255. Likewise, the code sequences 215 to 217 of the slices are found to belong to the region of divided frame 235 by decoding the positional information of the header. Therefore, the code sequence divider 254 does not divide the code sequences 214 to 217, but outputs them to the decoder 255.

Next, the header of the code sequence 218 of the slice is detected to decode its positional information. With this operation, the code sequence 218 is found to belong to the region of divided frame 236 which is different from the region just before. Therefore, the division controller 252 outputs the code sequence division control signal 270 to the code sequence divider 254. The code sequence divider 254 selects the destination, to which the input code sequence 261 is outputted, to the decoder 256 by the code sequence division control signal 270. Since the input code sequence 260 is delayed by the delay circuit 253, the selection is made on the top of the header of the code sequence 218 of slice.

Since the code sequences 218 to 220 of the slices belong to the divided frame 236, these code sequences are not divided and are outputted to the decoder 256. In the same manner, the code sequence divider 254 divides the code sequences at the top of header of the code sequence 221 of the slice, and then the destination to which the input code sequence 261 is outputted is selected the decoder 257. Thereafter, the code sequences are divided at the top of the header 224 and the headers of the code sequences 228 and 230 of the slices, thereby obtaining three divided code sequence corresponding to the respective regions as shown in FIG. 8B.

The thus divided division code sequences 262, 263 and 264 are decoded by the decoders 255, 256 and 257. When the code sequences are decoded, the header information of a hierarchical level of frame or higher levels is required. However, since the header information is decoded by the header detector, the information and the dividing method are received from the division controller 252 as a decoding information signal 271. The decoded divided picture signals 265, 266 and 267 are synthesized into the entire frame by the picture synthesizer 258, and the entire frame is further subjected to D/A conversion by the D/A converter 259 to be an output picture 268. At this moment, the picture synthesizer 258 obtains the synthesis method of the picture as a picture synthesis control signal 272.

Next, a second example of the second decoding apparatus will be described with reference to FIGS. 8A, 8B, 8C, 8D and 9. The second example is different from the first example in that the input code sequence of FIG. 8A is divided into the code sequences corresponding to the respective regions as shown in FIG. 8C and that the header of a hierarchical level of frame or higher levels is decoded by each decoder. This operation will be described below.

First, the header detector 251 searches a header of the input code sequence 260. In the case where the detected header is a header of a hierarchical level of frame or higher levels, the division controller 252 outputs the code sequence division control signal 270 so that the code sequence divider 254 distributes its header to the decoders 255, 256 and 257. Subsequently, when the header of the slice is detected, the positional information of the header is decoded to output it as the header information 269 to the division controller 252. The way the division controller 252 divides the code sequence of the slice is the same as the first example. After the next header of a hierarchical level of frame or higher levels is detected, the code sequence divider 254 distributes the detected header to the respective decoders 255, 256 and 257. When the header of the next slice is detected, the code sequence is divided based on the positional information of the header. This method is the same as the one described in the first example.

In the case where the input code sequence of FIG. 8A is inputted, the header detector 251 first detects the header 211. Since the header 211 is a header of a hierarchical level of frame or higher levels, the code sequence divider 254 outputs the header 211 to the respective decoders 255, 256 and 257. Next, when the header 212 of the code sequence 214 is detected, the code sequence divider 254 outputs the input code sequence 261 to the decoder 255 alone. A method for dividing the code sequences which belong to the succeeding frame 234 is the same as the one described in the first example. When the header 224 is detected, the code sequence divider 254 outputs the header 224 to the decoders 255, 256 and 257 since the header 224 is a header of a hierarchical level of frame or higher levels. A method for dividing the code sequences of the succeeding slices is the same as that of the first example. With the above operation, the divided code sequences of FIG. 8C are obtained.

In the case where the divided code sequences of FIG. 8C are decoded by the decoders 255, 256 and 257, since the header of a hierarchical level of frame or higher levels is included in each of the divided code sequences 262, 263 and 264, the decoding information is obtained by decoding the header with each of the decoders. Therefore, it is not necessary to obtain the decoding information from the division controller 252 as in the first example. The picture synthesis process of the divided frames obtained by the decoders 255, 256 and 257, which is performed by the picture synthesizer 258 is the same as in the first example.

As described above, it is understood that the decoding apparatus for moving pictures according to the present invention shown in FIG. 9 makes it possible to obtain the moving pictures of the entire picture by the following operation. The input code sequence is divided based on the positional information of the headers of the input code sequence, the divided code sequences are decoded at the same time, and the decoded divided pictures are synthesized.

Figure 10:
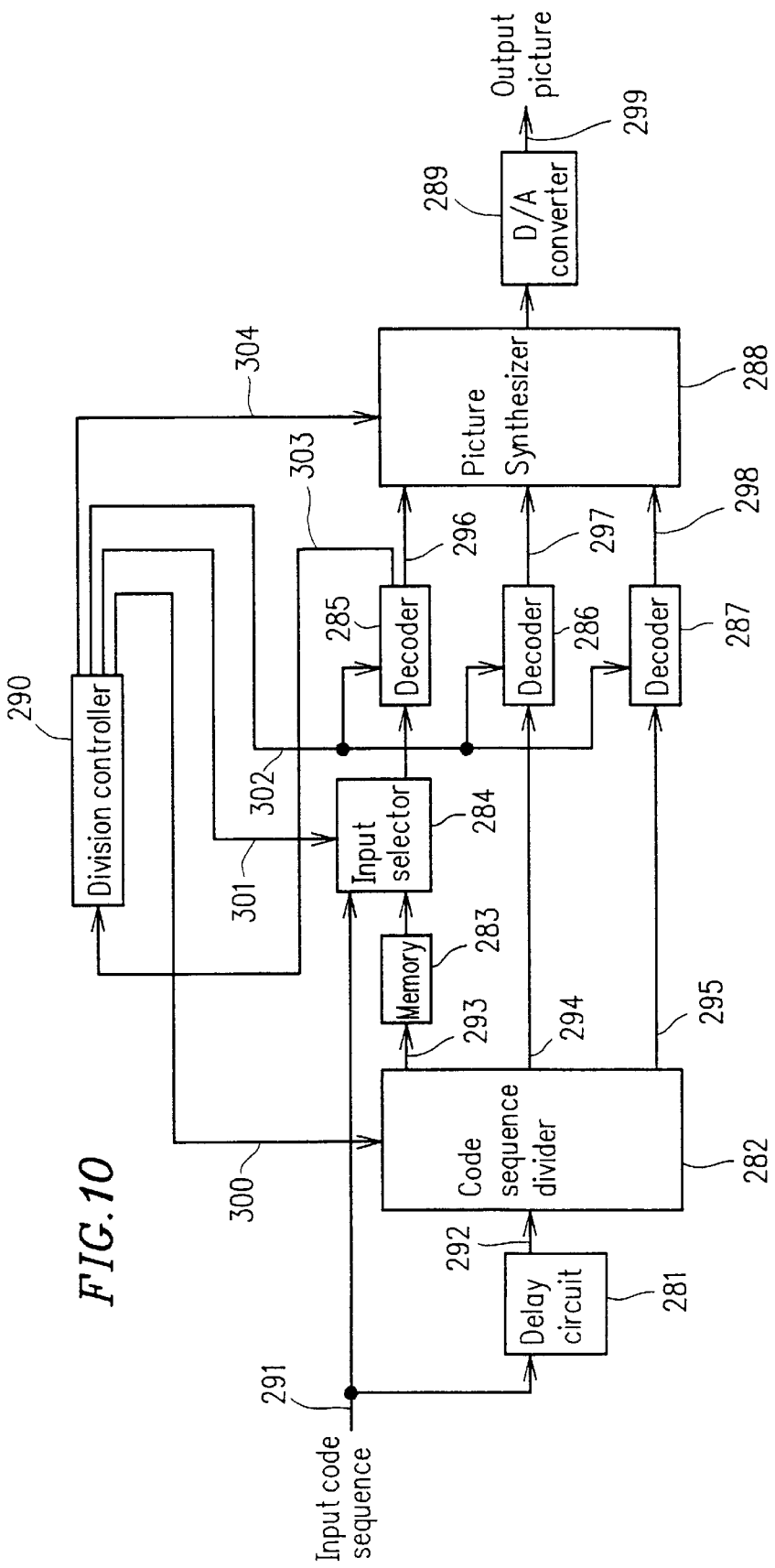
FIG. 10 is a block diagram showing a third example of the second decoding apparatus for moving pictures according to the present invention.

Next, a third example of the second decoding apparatus for moving pictures according to the present invention will be described with reference to FIGS. 8A, 8B, 8C, 8D and 10. FIG. 10 is a block diagram showing a decoding apparatus for moving pictures. The decoding apparatus includes a delay circuit 281, a code sequence divider 282, a memory 283, an input selector 284, a first decoder 285, second decoders 286 and 287, a picture synthesizer 288, a D/A converter 289, and a division controller 290. Assuming that the code sequence of FIG. 8A is inputted as the input code sequence 291, the frame is horizontally divided into three regions, and the upper region, the central region, and the lower region of the frame are decoded by the decoders 285, 286 and 287, respectively.

The input code sequence 291 is inputted into the input selector 284 and the delay circuit 281 at the same time. At the moment when the input code sequence 291 is read in the input selector 284, the same data is read in the delay circuit 281. When the input selector 284 does not read the input code sequence 291, the delay circuit 281 does not read the input code sequence 291 either. The input selector 284 receives the input code sequence 291 and the divided code sequence 293 which is outputted by the code sequence divider 282 as an input, and then outputs either of them to the decoder 285. In the initial state, the input selector 284 outputs the input code sequence 291. While the input selector 284 outputs the input code sequence 291, the decoder 285 decodes the header information of a hierarchical level of frame or higher levels of the input code sequence 291 to search the header of the slice. When the slice detected by the decoder 285 belongs to the different divided region from the one to which the slice just before belongs, the division controller 290 outputs the slice to the code sequence divider 282 as a code sequence division control signal 300, based on the predetermined method for dividing the frame. Since the top code sequence 214 of the slice belongs to the upper region of the frame, the code sequence division control signal 300 is sent so that the code sequence divider 282 outputs the code sequence 214 as a divided code sequence 293.

Upon receiving the code sequence division control signal 300, the code sequence divider 282 selects the destination to which the input code sequence 292 is to be outputted through the delay circuit 281. In the case where the code sequence divider 282 outputs the input code sequence 292 to the memory 283 as the divided code sequence 293 at a certain moment, when the code sequence division control signal 300 is inputted from the division controller 290, the destination, to which the input code sequence 292 is outputted, is selected and the input code sequence 292 is outputted to the decoder 286 as the divided code sequence 294. When the destination, to which the input code sequence 292 is outputted, is selected, the delay circuit 281 delays the input of input code sequence 291 to the code sequence divider 282 so that the header of the slice detected in the decoder 285 is included in the divided code sequence after the destination is selected.

The decoder 285 continues to detect the header of the slice. At the time when the division of the input code sequence for one frame is completed, a header information 303 is outputted to the division controller 290. Upon receiving the header information 303 from the decoder 285, the division controller 290 selects the input of the input selector 284 so that the code sequences stored in the memory are outputted to the decoder 285, based on an input selection control signal 301. The decoder 285 decodes the code sequence stored in the memory 283. The decoders 286 and 287 can perform decoding while the decoder 285 detects the header of the slice. The header of a hierarchical level of frame or higher levels is required for decoding. Since the header is decoded by the decoder 285, the decoders 286 and 287 receive the information and the dividing method as a decoding information signal 302 from the division controller 290. The decoded divided picture signals 296, 297 and 298 correspond to the divided frames 235, 236 and 237, respectively and are synthesized by the picture synthesizer 288 into the entire frame. Then, after the entire frame is subject to D/A conversion by the D/A converter 289, it is outputted as an output picture 299. At this time, the picture synthesizer 288 obtains a method for synthesizing a picture as a picture synthesis control signal 304 from the division controller 290.

When the decoding for one frame is completed, the division controller 290 selects the input code sequence 291 as the input of the input selector 284. Then, the decoder 285 decodes the next header of a hierarchical-level of frame or higher levels, detects the header of the slice, and divides the input code sequence to continue the decoding process.

The above operation will be described regarding the case where the input code sequence of FIG. 8A is inputted. In the initial state, the input selector 284 selects the input code sequence 291, and the code sequence divider 282 outputs the code sequence to the memory 283. The decoder 285 first decodes the header 211 and then searches the header of the slice. When the header 212 of the slice is detected, the code sequence 214 of the slice is found to belong to the region of the divided frame 235 by decoding the positional information of the header 212 of the slice. Therefore, the code sequence divider 282 outputs the input code sequence 291 following the header 211 to the memory 283. Likewise, the code sequences 215 to 217 of the slices are found to belong to the region of the divided frame 235 by decoding the positional information of the header. Therefore, the code sequence divider 282 does not divide the code sequences 214 to 217 of the slices, but outputs them to the memory 283. Next, the decoder 285 detects the header of the code sequence 218, thereby decoding the positional information of the header.

By this operation, the code sequence 218 of the slice is found to belong to the region of the divided frame 236, that is, the region different from the one just before. Thus, the division controller 290 outputs the code sequence division control signal 300 to the code sequence divider 282. The code sequence divider 282 selects the decoder 286 as the destination, to which the input code sequence 291 is to be outputted. Since the input code sequence 291 is delayed by the delay circuit 281, the selection is made at the top of the header of code sequence 218 of the slice. As the code sequences 218 to 220 belong to the region of the divided frame 236, the code sequences are not divided and are outputted to the decoder 286. In the same manner, the code sequence divider 282 divides the code sequence at the top of the header of code sequence 221 of the slice and selects the decoder 287 as the destination, to which the input code sequence 291 is outputted. When the header of the code sequence 218 of the slice is detected after the code sequence divider 282 outputs the code sequences 214 to 217 as the division code sequence 293, the code sequence divider 282 outputs the input code sequence as a divided code sequence 294.

At the time when the decoder 285 detects the header 224, all the code sequences of the frame 234 are divided. Therefore, the division controller 289 selects an output of the memory 283 as an input of the input selector 284 by an input selection control signal 301. At this moment, the code sequences 214 to 217 of the slice are stored in the memory 283, and the code sequences 218 to 220 and 221 to 223 of the slice are inputted to the decoders 286 and 287, respectively. Then, the decoders 285, 286 and 287 decode the inputted divided code sequences, respectively. The decoded divided frames 235, 236 and 237 are synthesized into the frame 234 by the picture synthesizer 288.

When the decoding for one frame is completed, the input selector 284 selects the input code sequence 291 as an input. Then, the decoder 285 decodes the header of a hierarchical level of frame or higher levels and searches the header of the slice once more, and the input code sequence is divided. By this division, the code sequences 225 to 227 of the slice corresponding to the region of divided frame 239, code sequences of 228 and 229 of the slice corresponding to the region of divided frame 240, and code sequences 230 to 233 corresponding to the region of divided frame 241 are obtained as divided code sequences. The obtained divided code sequences are decoded, thereby obtaining the divided frames 239, 240 and 241. Then, the frame 238 is obtained by synthesizing the divided frames 239, 240 and 241.

From the above description, it is understood that the decoding apparatus for moving pictures according to the present invention shown in FIG. 10 makes it possible to obtain the moving pictures of the entire picture by dividing the input code sequence, encoding the divided code sequence at the same time, and synthesizing the decoded divided pictures.

Figure 11A:
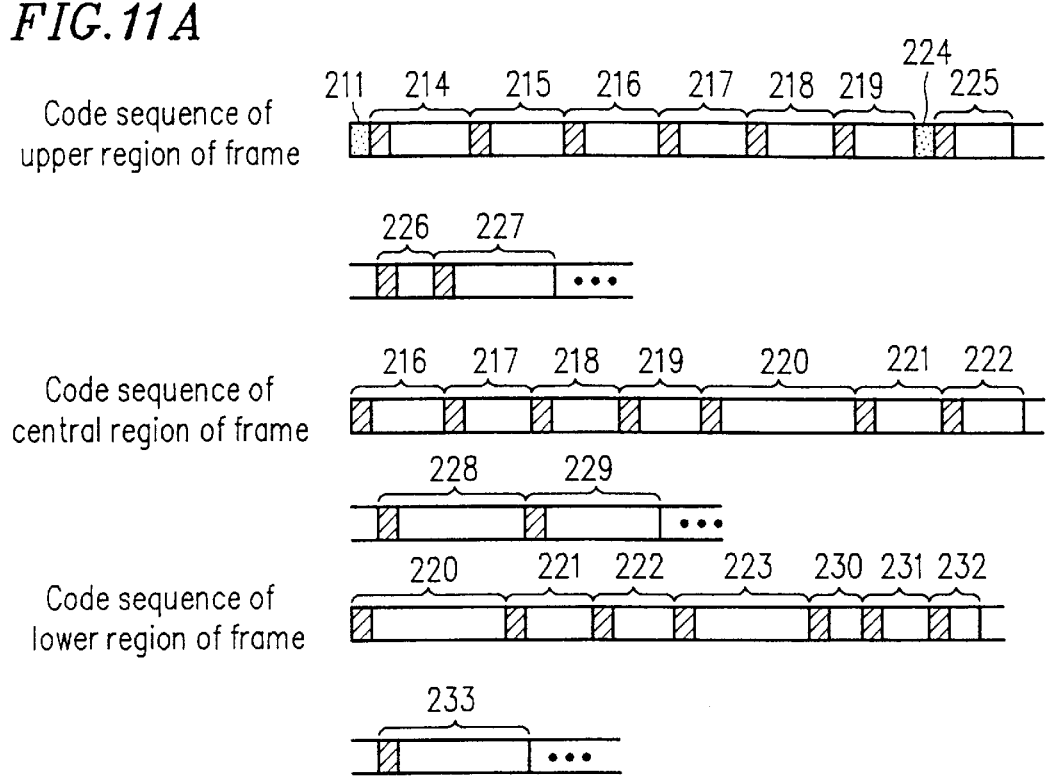
FIGS. 11A and 11B are schematic diagrams showing patterns of a third example of the second decoding method for moving pictures according to the present invention.
Figure 11B:
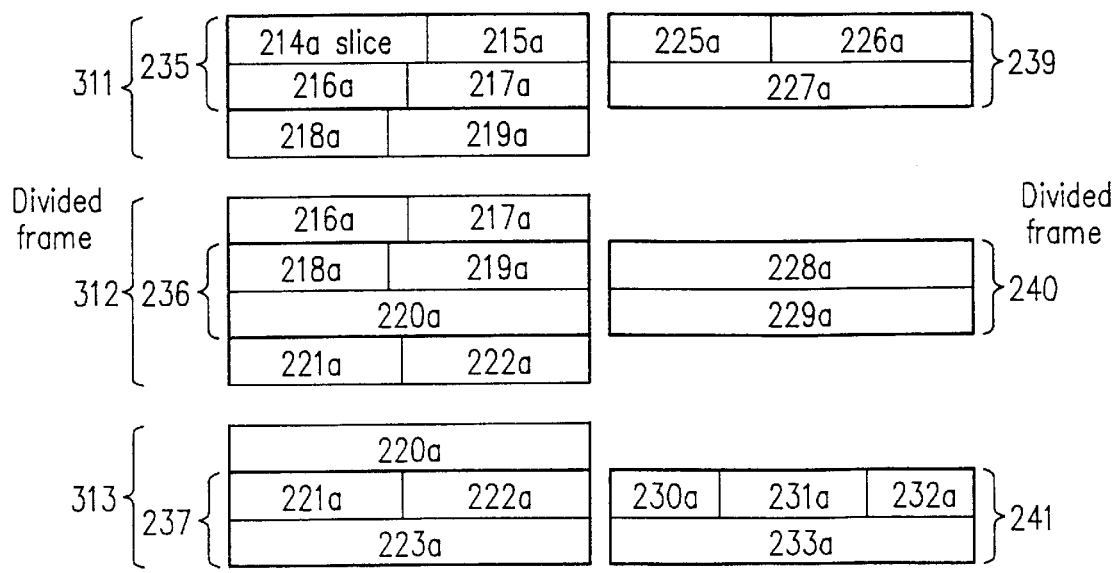

Next, a third example of the second decoding method for moving pictures according to the present invention will be described with reference to FIGS. 8A, 8B, 8C, 8D, 11A and 11B. FIGS. 11A and 11B are schematic diagrams showing divided code sequences in a method for dividing a code sequence of a moving picture into a plurality of parts and decoding them. In this example, assuming that the frame 238 is encoded by using the frame 234 as a reference frame and is not referred to by the other frames.

FIG. 8A is an input code sequence. The input code sequence is divided so as to correspond to the divided frames which are horizontally divided as shown in FIG. 8D. The code sequence is divided, taking the range which is referred to during decoding into consideration. For example, assuming that the frame 238 has the range of the reference of one macro block on the upper, lower, right and left sides, respectively. In this case where the code sequence of the frame 234 is divided, it is divided so that the code sequence having a region obtained by enlarging the divided frame on the upper and lower sides by one macro block is distributed to each divided code sequence. The divided frame 235 includes the slices 214a, 215a, 216a and 217a. However, since the reference of the divided frame 239 to the divided frame 235 reaches the slices 218a and 219a, the divided code sequence of the divided frame 235 is forced to include the code sequences 218 and 219 of the slices. Likewise, the divided code sequence corresponding to the divided frame 236 includes the code sequences 216, 217, 221 and 222, and the divided code sequence corresponding to the divided frame 237 includes the code sequence 220 of the slice. Since the frame 238 is not referred to by the other frames, the code sequence is divided in the same manner as in the first example of the second decoding method.

The thus divided code sequences are shown in FIG. 11A. When the divided code sequences of the respective divided regions are decoded, divided frames 311, 312, 313, 239, 240 and 241 are obtained as shown in FIG. 11B. The frame 234 is obtained by synthesizing the divided frames 235, 236 and 237 after eliminating an overlapping portion of the divided frames 311, 312, and 313. Since the divided frames 239, 240 and 241 do not have overlapping portion, it is possible to obtain the frame 238 by synthesizing them without elimination.

From the above description, it is understood that the moving pictures of the entire picture can be reproduced by the following operation, using a code sequence of moving pictures as an input, based on the predetermined dividing method of the picture. The code sequence is divided so as to correspond to the respective regions of the divided pictures, thereby generating the divided code sequences. Then, the divided pictures are decoded for the respective divided code sequences, and the obtained set of divided pictures is synthesized.

Figure 12:
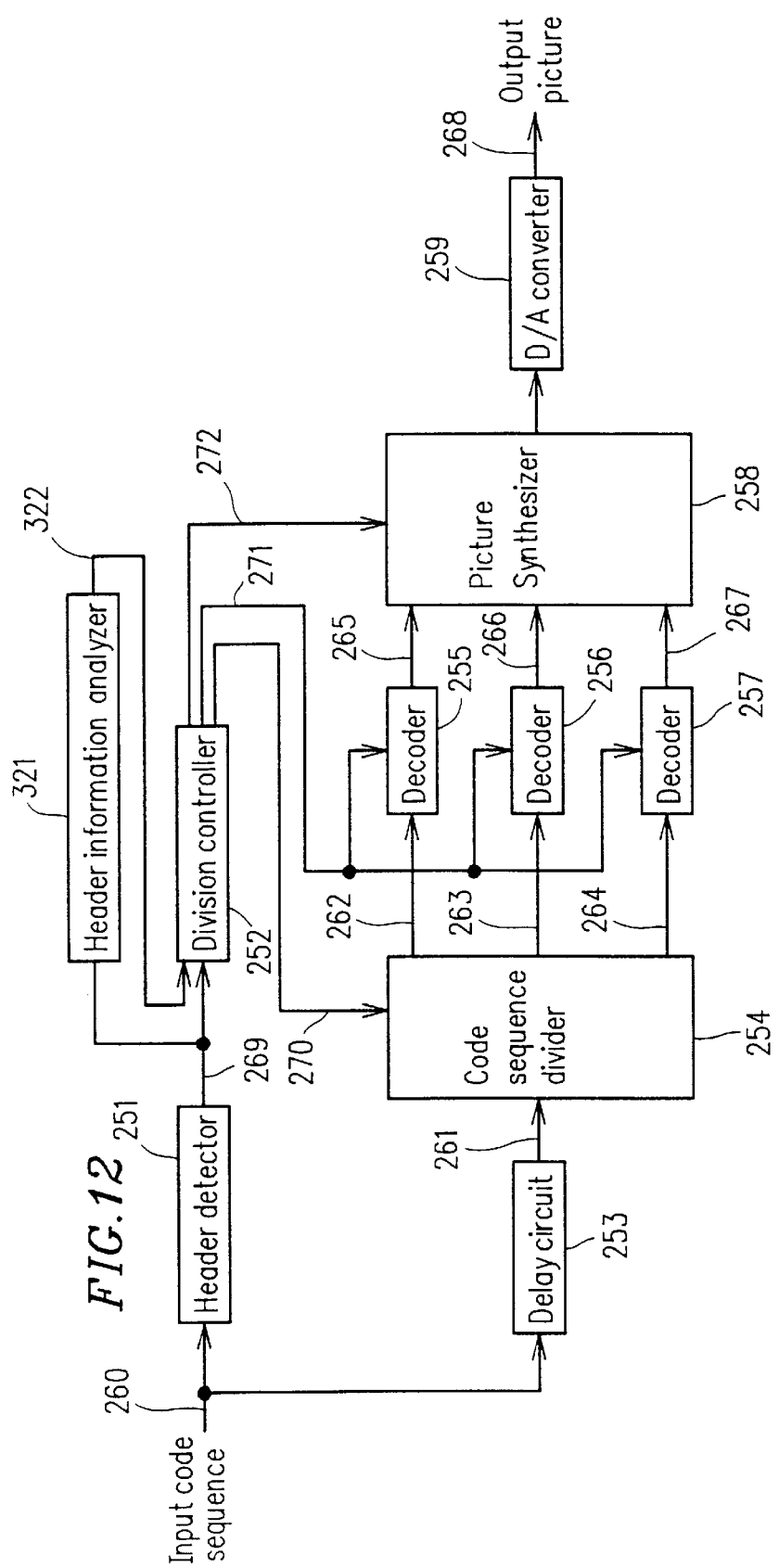
FIG. 12 is a block diagram of a fourth example of the second decoding apparatus for moving pictures according to the present invention.

Next, a fourth example of the second decoding apparatus according to the present invention will be described with reference to FIGS. 8A, 8B, 8C, 8D, 11A, 11B and 12. FIG. 12 is a decoding apparatus for moving pictures. The decoding apparatus includes a header detector 251, a division controller 252, a delay circuit 253, a code sequence divider 254, decoders 255, 256 and 257, a picture synthesizer 258, a D/A converter 259, and a header information analyzer 321. In this example, the case where the frame is horizontally divided into three regions, and the upper, central and lower regions of the frame are decoded by the decoders 255, 256 and 257, respectively, will be described.

The input code sequence 260 is inputted to the header detector 251 and the delay circuit 253 at the same time. The header detector 251 decodes the header of a hierarchical level of frame or higher levels in the input code sequence 260 and searches the header of the slice. In the case where the code sequence of FIG. 8A is inputted, the header 211 is first decoded. The header detector 251 outputs the header information 269 to the division controller 252 and the header information analyzer 321. The header information analyzer 321 determines the range of each frame which is referred to by the other frames, based on the reference relationship of the frames. Then, the header information analyzer 321 outputs the obtained range as a motion compensation information signal 322 to the division controller 252.

Subsequently, the header detector 251 detects the header of the slice, and the positional information of the header is decoded. Then, the positional information is outputted to the division controller 252 as the header 269. The division controller 252 determines a dividing method of an input code sequence, based on the predetermined dividing method of the frames and the range of motion compensation obtained from the header information analyzer 321. For example, assuming that the frame 238 is encoded, referring to the frame 234 by the motion compensation of one macro block of the upper, lower, right and left sides and is not referred to by the other frames. In this case, the code sequence of the frame 234 is divided, taking the range of the motion compensation into the consideration. The reference of the divided frame 239 to the divided frame 235 reaches the slices 218*a* and 219*a*. The reference of the divided frame 240 to the divided frame 236 reaches the slices 216*a*, 217*a*, 221*a* and 222*a*, and the reference of the divided frame 241 to the divided frame 237 reaches the slice 220*a*.

The division controller 252 determines the range of the motion compensation as described above and divides the input code sequence 260 by outputting the code sequence division control signal 270 to the code sequence divider 254. Since the code sequences 214 and 215 are not referred to by the other regions, they are inputted to the decoder 255 alone. Since the code sequences 216 and 217 are referred to by the divided frame 240, they are inputted to the decoders 255 and 256. The code sequences 218 and 219 of the slice of the divided frame 236 are referred to by the divided frame 239, they are inputted to the decoders 255 and 256. Likewise, the code sequences 220 to 223 of the slices are divided, taking the motion compensation into consideration and then inputted to each decoder. For the code sequences of the frame 238, they are divided so as to correspond to the divided frames 239, 240 and 241, without taking into the motion compensation into consideration. As a result, the code sequences which are inputted to the respective decoders are as shown in FIG. 11A.

When the code sequences of FIG. 11A are decoded by the decoders 255, 256 and 257, it is possible to decode the code sequences without accessing the memory of another decoder since the code sequences of the reference pictures required for decoding in the respective regions. By the decoding, the divided frames 311 and 239, 312 and 240, and 313 and 241 are obtained in the decoders 255, 256 and 257, respectively. The picture synthesizer 258 synthesizes the divided frames by eliminating the overlapping portions using the picture synthesis control signal 271. The synthesized frame is inputted to the D/A converter 259. With this operation, the frame 234 is obtained by synthesizing the divided frames 235, 236 and 237 from the divided frames 311, 312 and 313. The frame 238 is obtained by synthesizing the divided frames 239, 240 and 241.

From the above description, it is understood that the decoding apparatus for moving pictures according to the present invention shown in FIG. 12 makes it possible to obtain the moving picture of the entire picture by dividing the input code sequence, decoding them at the same time, and synthesizing the decoded divided pictures.

Figure 13:
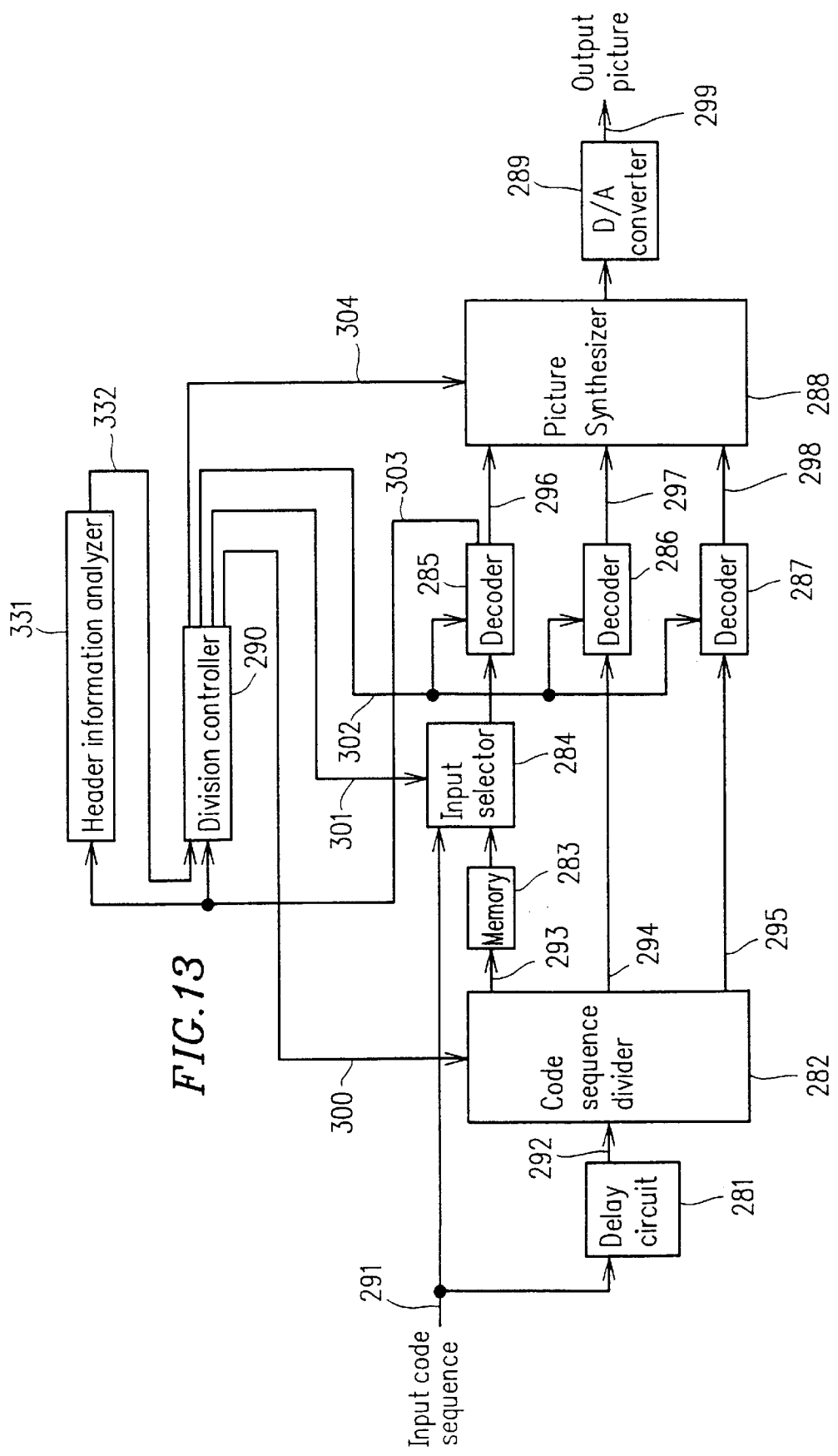
FIG. 13 is a block diagram showing a fifth example of the second decoding apparatus for moving pictures according to the present invention.

Next, a fifth example of the second decoding apparatus for moving pictures according to the present invention will be described with reference FIGS. 8A, 8B, 8C, 8D, 11A, 11B and 13. FIG. 13 is a block diagram of a decoding apparatus for moving pictures. The decoding apparatus includes a delay circuit 281, a code sequence divider 282, a memory 283, an input selector 284, a first decoder 285, second decoders 286 and 287, a picture synthesizer 288, a D/A converter 289, a division controller 290, and a header information analyzer 331. In this example, assuming that the code sequence of FIG. 8A is inputted as the input code sequence 291, a frame is horizontally divided into three regions, and the upper, central, and lower regions are decoded by the decoders 285, 286 and 287, respectively.

The input code sequence 291 is inputted to the input selector 284 and the delay circuit 281 at the same time. The input selector 284 receives the input code sequence 291 and the divided code sequence 293 outputted by the code sequence divider 282 as an input and outputs either of them to the decoder 285. In the initial state, the input selector 284 outputs the input code sequence 291. While the input selector 284 outputs the input code sequence 291, the decoder 285 decodes the header of a hierarchical level of frame or higher levels in the input code sequence 291 and searches the header of the slice. The header 211 is first decoded. The decoder 285 outputs the header information 303 to the division controller 290 and the header information analyzer 331. The header information analyzer 331 determines the range of each frame which is referred to by the other frames, based on the reference relationship of the frame. Then, the header information analyzer 331 outputs the obtained range as a motion compensation information signal 332 to the division controller 290.

Subsequently, the decoder 285 detects the header of the slice. After detecting the header 212 of the slice, the decoder 285 decodes the positional information of the header. Then, the positional information is outputted to the division controller 290 as the header information 303. The division controller 290 determines a dividing method of an input code sequence, based on the predetermined dividing method of the frames and the range of motion compensation obtained from the header information analyzer 331. The dividing method is the same as the one described in the third example of the second decoding apparatus according to the present invention.

The division controller 290 divides the input code sequence 291 by outputting the code sequence division control signal 300 based on the determined dividing method to the code sequence divider 282. When the division of the code sequence of the frame 234 is completed by the method described in the third example of the second decoding apparatus according to the present invention, the decoder 285 outputs the header information 303 to the division controller 290. On receiving the header information 303 from the decoder 285, the division controller 290 selects an input so as to output the code sequences stored in the memory to the decoder 285, based on the input selecting control signal 301. At this moment, the code sequences 214 to 219 of the slices are stored in the memory 283. The code sequences 216 to 222, and 220 to 223 of the slices are inputted to the decoders 286 and 287, respectively. Then, the decoder 285 decodes the code sequences of the slices stored in the memory 283. The decoders 286 and 287 can decode the code sequences while the decoder 285 detects the header of the slice. During the decoding, the header information of a hierarchical level of frame or higher levels is required. Since the header is decoded by the decoder 285, the information and the dividing method are received from the division controller 290 as the decoding information signal 302. The decoders 285, 286 and 287 decode the code sequences by using the picture obtained by decoding the divided code sequences as a reference picture.

The decoded divided picture signals 295, 296 and 297 corresponding to the respective divided frames 311, 312 and 313 are synthesized into the entire frame by the picture synthesizer 288. Then, after the synthesized frame is subjected to D/A conversion by the D/A converter 289, the frame 234 is outputted as the output picture 299. At this moment, the picture synthesizer 288 receives the method for dividing a picture as the picture synthesis control signal 304 from the division controller 290, and then synthesizes the divided frames after eliminating the overlapping portions. Therefore, the divided frames 311, 312 and 313 become the divided frames 235, 236 and 237, respectively, and therefore are capable of being synthesized.

When the decoding for one frame is completed, the division controller 290 selects the input code sequences 291 as an input of the input selector 284. Then, the decoder 285 decodes the header 224, detects the header of the slice, and divides the input code sequence. Since the frame 238 is not referred to by the other pictures, it is unnecessary to take the range of motion compensation into consideration when the input code sequence is divided. Thus, the code sequences 225 to 227 are inputted as the divided sequence to the memory 283, the slice code sequences 228 and 229 are inputted as the divided code sequence to the decoder 286, and the slice code sequences 230 to 233 are inputted as the divided sequence to the decoder 287, respectively. When the division of the code sequences in the frame 238 is completed, the decoder 285 transmits the information to the division controller 290, based on the header information 303. The division controller 290 selects the output of the memory 283 as the input of the input selector 284. Then, the decoders 285, 286 and 287 decode the divided code sequences. Since the decoded divided frames 239, 240 and 241 do not have overlapping portions, they are synthesized by the picture synthesizer 288 without elimination. Then, after the frame 238 is subject to D/A conversion by the D/A converter 289, it is outputted as the output picture 299.

From the above description, it is understood that the decoding apparatus for moving pictures according to the present invention shown in FIG. 13 makes it possible to obtain the moving picture of the entire picture by dividing the input code sequence, decoding the divided code sequences at the same time, and synthesizing the decoded divided picture.

Although the size of the region which is synthesized by the picture synthesizer 102 is controlled by the picture synthesis controller 103 in the examples of the first decoding apparatus for moving picture according to the present invention, the overlapping portions between adjacent regions may be eliminated when the intra-frame/inter-frame decodes 93, 94 and 95 read the picture data from the picture memories 96, 97 and 98.

The length of the slice is not required to be the same as that of the divided picture in the horizontally direction in the examples described with reference to FIGS. 5A to 5C. However, the slice may be shorter than the divided picture in the horizontal direction.

The method for dividing the slices can be determined so as to be suitable for each divided picture without any restraint.

Although the case where the encoding method using a macro block as the unit such as H. 261 and MPEG is used as a fundamental encoding method in the examples of the second encoding method, encoding apparatus, decoding method, and decoding apparatus, other encoding methods can be used as long as the header includes the positional information of the picture.

Although the header of a hierarchical level of picture or higher levels is included in the divided code sequence of the region including the upper left portion of the picture in the third examples of the second decoding method for moving pictures according to the present invention, the header may be included in all the divided code sequences, as described in the second example of the second encoding method for moving pictures.

Although the header of a hierarchical level of picture or higher levels is inputted only to the decode decoding the region including the upper left portion of the picture in the second decoding apparatus for moving pictures according to the present invention, the header may be inputted to all the decoders, as described in the second example of the second encoding method for moving pictures.

In the examples above described, pictures may be frame or field. It is understood that the method and the apparatus according to the invention may easily be applied to image components, such as frames, fields, or portions of frames or fields. Although the frame is divided into three regions in the examples, it may be divided into any number of regions. Although the picture is vertically or horizontally divided in the examples, it may also be diagonally divided. Also, it is understood that a size of the sub-pictures may be enlarged in the first and/or second direction(s).

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method of encoding a picture, comprising the steps of:

receiving the picture and dividing the picture into N sub-pictures, N being an integer equal to or larger than 2, wherein at least one of the N sub-pictures overlaps another one of the N sub-pictures to define an overlapping region;

generating a header related to a hierarchical level of picture or higher levels;

encoding the N sub-pictures and generating N code sequences corresponding to the respective N sub-pictures, wherein the N code sequences are N sets of transform coefficients and the N sets of transform coefficients include overlapping coefficients corresponding to the overlapping region;

adding the header to one of the N code sequences; and generating a code sequence corresponding to the picture by combining the N code sequences together at a portion corresponding to a boundary between the N sub-pictures and a boundary between continuous pictures in terms of time, wherein an order of the combined code sequences is equal to an order of code sequences obtained by encoding the picture without dividing the picture.

2. An apparatus for encoding a picture, comprising:

picture division means for receiving the picture and dividing the picture into N sub-pictures, N being an integer equal to or larger than 2, wherein at least one of the N sub-pictures overlaps another one of the N sub-pictures to define an overlapping region;

control means for generating a control signal regarding a header related to a hierarchical level of picture or higher levels;

encoding means for encoding the N sub-pictures, generating N code sequences corresponding to the N sub-pictures and adding a header to one of the N code sequences in accordance with the control signal, wherein the N code sequences are N sets of transform coefficients and the N sets of transform coefficients include overlapping coefficients corresponding to the overlapping region; and code sequence combining means for generating a code sequence corresponding to the picture by combining the N code sequences together at a portion corresponding to a boundary between the N sub-pictures and a boundary between continuous pictures in terms of time, wherein an order of the combined code sequences is equal to an order of code sequences obtained by encoding the picture without dividing the picture.

3. A method of decoding a code sequence, comprising the steps of:

receiving the code sequence including a header and detecting the header;

dividing the code sequence into N code sequences, N being an integer equal to or larger than 2, based on the detected header and a predetermined dividing method of a picture, wherein the N code sequences are N sets of transform coefficients and the N sets of transform coefficients include overlapping coefficients corresponding to an overlapping region;

generating N sub-pictures corresponding to the N code sequences, wherein at least one of the N sub-pictures overlaps another one of the N sub-pictures to define the overlapping region; and obtaining one picture by synthesizing the N sub-pictures.

4. A method according to claim 3, wherein a code sequence succeeding the header is treated as a code sequence corresponding to an upper left portion of the picture in the case where the detected header is related to a hierarchical level of picture or higher levels.

5. A method according to claim 3, wherein the method further includes, in a case where the detected header relates to a hierarchical level of picture or higher levels, the step of adding the detected header to one of the N code sequences, the one code sequence corresponding to a first one of the N sub-pictures, and wherein a further one of the N code sequences succeeds the detected header, (a) said further code sequence corresponding to a second one of the N sub-pictures, and (b) the first sub-picture being different from the second sub-picture.

6. A method according to claim 3, wherein the method further includes the step of obtaining a range of motion compensation from the detected header, wherein the dividing step includes the step of determining a size of each of the N code sequences based on the range of motion compensation to specify the overlapping coefficients of the N code sequences, and wherein the synthesizing step includes the steps of:

specifying the overlapping region corresponding to the overlapping coefficients in which the N sub-pictures overlap each other;

eliminating the specified overlapping region from the N sub-pictures; and obtaining a picture by synthesizing the N sub-pictures in which the overlapping portion is eliminated.

7. An apparatus for decoding a picture, comprising:

detection means for receiving the code sequence including a header and detecting the header;

division control means for generating a control signal defining a timing for dividing the code sequence based on the detected header and a predetermined dividing method of a picture;

code sequence division means for dividing the code sequence into N code sequences, N being an integer equal or larger than 2 in accordance with the control signal, wherein the N code sequences are N sets of transform coefficients and the N sets of transform coefficients include overlapping coefficients corresponding to an overlapping region;

decoding means for generating N sub-pictures corresponding to the N code sequences by decoding the N code sequences, wherein at least one of the N sub-pictures overlaps another one of the N sub-pictures to define the overlapping region; and picture synthesis means for obtaining one picture by synthesizing the N sub-pictures.

8. An apparatus according to claim 7, wherein a code sequence succeeding the header is treated as a code sequence corresponding to an upper left portion of the picture, in the case where the detected header is related to a hierarchical level of picture or higher levels.

9. An apparatus according to claim 7, wherein in a case where the detected header relates to a hierarchical level of picture or higher levels, the division control means outputs, to the code sequence division means, a further control signal for causing the code sequence division means to add the detected header to one of the N code sequences output from the code sequence division means, the one code sequence corresponding to a first one of the N sub-pictures, wherein a further one of the N code sequences output from the code sequence division means succeeds the detected header, (a) said further code sequence corresponding to a second one of the N sub-pictures, and (b) the first sub-picture being different from the second sub-picture, and wherein the apparatus further comprises code sequence output means for distributing the detected header to the decoding means in accordance with the further control signal.

10. An apparatus according to claim 7, wherein the apparatus further includes a header information analysis means for obtaining information indicating a range of motion compensation from the detected header, wherein the control signal generated by the division control means determines a size of the N code sequences based on the range of motion compensation to specify the overlapping coefficients of the N code sequences, and wherein the picture synthesis means obtains a picture by specifying the overlapping region corresponding to the overlapping coefficients in which the N sub-pictures overlap each other, eliminating the specified overlapping region from the N sub-pictures; and synthesizing the N sub-pictures in which the overlapping region is eliminated.

11. An apparatus for decoding a code sequence, comprising:

first decoding means for detecting a header by decoding the code sequence including the header;

division control means for generating a first control signal defining a timing for dividing the code sequence and a second control signal for defining a timing for completing a division of a code sequence corresponding to one picture, based on the detected header and a predetermined dividing method of a picture;

code sequence dividing means for dividing the code sequence into N code sequences, N being an integer equal to or larger than 2 in accordance with the first control signal, wherein the N code sequences are N sets of transform coefficients and the N sets of transform coefficients include overlapping coefficients corresponding to an overlapping region;

storing means for storing the first code sequence;

decoding means for generating N sub-pictures corresponding to the N code sequences by decoding the N code sequences, wherein at least one of the N sub-pictures overlaps another one of the N sub-pictures to define the overlapping region; and picture synthesis means for obtaining one picture by synthesizing the N sub-pictures.

12. An apparatus according to claim 11, wherein a code sequence succeeding the header is treated as a code sequence corresponding to an upper left portion of the picture in the case where the detected header is related to a hierarchical level of picture or higher levels.

13. An apparatus according to claim 11, wherein, in the case where the detected header relates to a hierarchical level of picture or higher levels, (a) the division control means outputs, to the code sequence dividing means, a third control signal for adding the header to one of the N code sequences, (b) the one code sequence corresponds to a first one of the N sub-pictures, (c) a further code sequence output from the code sequence division means succeeds the detected header and corresponds to a second one of the N sub-pictures, and (d) the first sub-picture is different from the second sub-picture, and wherein the code sequence output means distributes the detected header to the decoding means in accordance with the third control signal.

14. An apparatus according to claim 11, wherein the apparatus further includes a header information analysis means for obtaining information indicating a range of a motion compensation from the detected header, wherein the first control signal generated by the division control means determines a size of the first to the Nth code sequences so that at least part of the first to the Nth code sequences overlaps each other, based on the information indicating the range of the motion compensation, and wherein the picture synthesis means obtains a picture by specifying a portion in which the first to the Nth sub-pictures overlap each other, eliminating the specified overlapping portion from the first to the Nth sub-pictures and synthesizing the first to the Nth sub-picture in which the overlapping portion is eliminated.

* * * * *